United States Patent [19]
Christian et al.

[11] Patent Number: 5,668,352
[45] Date of Patent: Sep. 16, 1997

[54] DATA COMPRESSION IN DIGITIZING TABLET

[75] Inventors: Kevin G. Christian, Fort Collins; John S. Keck; Steven K. Skoog, both of Colorado Springs, all of Colo.

[73] Assignees: AT&T Global Information Solutions Company, Dayton, Ohio; Hyundai Electronics America, San Jose, Calif.; Symbios Logic Inc., Fort Collins, Colo.

[21] Appl. No.: 360,527

[22] Filed: Dec. 21, 1994

[51] Int. Cl.⁶ ................................................ G08C 21/00
[52] U.S. Cl. ........................ 178/18; 345/179; 382/233
[58] Field of Search ............................ 382/233, 234; 178/18, 19, 20; 345/173, 179, 156, 180; 342/185

[56] References Cited

U.S. PATENT DOCUMENTS

| | | | |
|---|---|---|---|
| 4,241,412 | 12/1980 | Swain | 342/185 X |
| 4,550,438 | 10/1985 | Convis et al. | 178/18 X |
| 4,650,926 | 3/1987 | Nakamura et al. | 178/18 |
| 4,707,572 | 11/1987 | Kable et al. | 178/18 |
| 4,963,703 | 10/1990 | Phillips et al. | 178/19 |
| 5,025,314 | 6/1991 | Tang et al. | 178/18 X |
| 5,194,852 | 3/1993 | More et al. | 178/19 X |
| 5,287,420 | 2/1994 | Barrett | 382/233 |
| 5,491,634 | 2/1996 | Miller et al. | 364/426.02 |

*Primary Examiner*—Wing F. Chan
*Assistant Examiner*—Paul Loomis
*Attorney, Agent, or Firm*—Wayne P. Bailey

[57] ABSTRACT

The invention concerns storage of correction tables for digitizing tablets. A digitizing tablet produces data indicative of position of a stylus. The data does not, in general, exactly indicate the position; errors exist. For example, a tablet may produce a data pair indicating a Cartesian position of (5.0, 6.0) when the position is actually (4.9, 6.1). Correction tables are used to correct the errors. These tables may be viewed as containing correct data for each possible pair of data produced by the tablet. Thus, in this example, a user would (a) receive (5.0, 6.0) from the tablet, (b) look up this data in the table, and (c) find that the actual position which corresponds to this data is (4.9, 6.1). The invention concerns compression of such tables, to reduce storage space.

17 Claims, 20 Drawing Sheets

AXIS OF SYMMETRY

AXIS OF SYMMETRY

FIG. 18
ROW → 2 4 5 3 6
ROW → 3 1 2 4 4
ROW → 2 3 3 5 4
ROW → 1 3 7 5 4
ROW → 2 4 3 5 6
FIG. 19
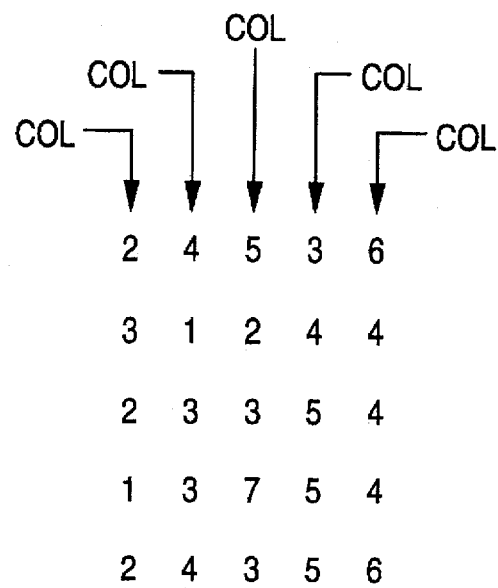
FIG. 20
```
┌───┐     ┌──────┐
│ 2 │ 4 8 12 │ 24 │
│ 3 │ 4 7 13 │ 21 │
│ 1 │ 3 7 14 │ 19 │
│ 2 │ 5 9 15 │ 23 │
│ 1 │ 3 6 11 │ 18 │
└───┘     └──────┘
```
FIG. 21
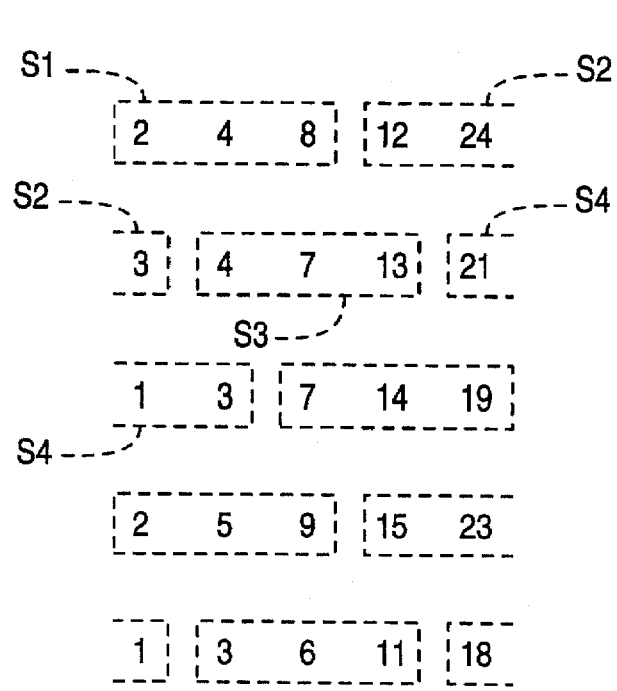

```
┌─────────────┐┌──────────────┐
│ 2   4   8  ││ 12   24   X  │
└─────────────┘└──────────────┘
  3   4   7    13   21   X
  1   3   7    14   19   X
  2   5   9    15   23   X
  1   3   6    11   18   X
```

DATA COMPRESSION IN DIGITIZING TABLET

The invention concerns digitizing tablets, which compute position signals, which tell the physical position of a hand-held stylus, which is near the tablet. Because the computed position signals do not perfectly indicate the physical position, a correction table is used to more accurately derive the physical position from computed position.

The invention concerns compression of the correction table, so that it occupies less memory space.

BACKGROUND OF THE INVENTION

Simplified Explanation of Digitizing Tablet

FIG. 1 illustrates a computer 4 and a digitizing tablet 3, which provides input to the computer. (The digitizing tablet need not be a separate element, as shown in FIG. 1, but can take the form of a transparent overlay of the display 2. This overlay configuration is frequently used in pen-based portable computers.)

The tablet-and-stylus combination provide input to the computer. A highly simplified explanation of the operation of the tablet will be given. The Inventors emphasize that this explanation is given for the purpose of illustrating general principles only, and that actual digitizing tablets are, in fact, more complex than this simple explanation would indicate. This simplified explanation is given primarily to provide a conceptual foundation for illustrating causes of errors.

FIG. 2 shows a digitizing tablet 3 and its associated stylus 6. In the tablet, there are four current-to-voltage amplifiers (labeled I-to-V), one at each corner. The stylus 6, when activated, produces a signal 9, as indicated in FIG. 3. This signal induces currents I1, I2, I3, and I4, which are detected by the I-to-V amplifiers.

The I-to-V amplifiers each produce a voltage (V) indicative of the size of its respective current (I). Processing apparatus, not shown, but known in the art, receives the voltage signals, and computes the position of the stylus 6.

The currents I1–I4 are induced because the stylus 6 acts as one plate of a capacitor. The digitizing tablet supplies the other plate: it bears a resistive surface, or grid, of a material such as indium tin oxide, which acts as the other plate.

As FIG. 4 indicates, when negative charge is applied to the tip 2 of the stylus 6, a positive charge is induced on the surface of the tablet 3. Currents I1–I4 supply this positive charge. Conversely, as in FIG. 5, a positive charge on the tip 2 of the stylus 6 induces a negative charge on the tablet. The currents I1–I4 supply this negative charge.

As FIG. 6 shows, each current can be viewed as following a direct path from the stylus to one corner of the tablet. The following reasoning allows stylus position to be inferred from the voltage signals:

1. The length of each path determines the resistance of the path.
2. The resistance determines the size of the current.
3. The size of the current determines the voltage produced by the amplifier.
4. Each amplifier voltage indicates its respective path length.

A highly simplified example will illustrate.

Assume that the stylus 6 in FIG. 6 represents a voltage source applied to the tablet. The paths have the relative lengths shown in FIG. 6, and also listed in the following Table 1.

TABLE 1

| PATH | RELATIVE LENGTH | RELATIVE RESISTANCE | RELATIVE CURRENT | RELATIVE I-to-V VOLTAGE |
|---|---|---|---|---|
| AA | 0.66 | 0.66 | 1.52 | 1.52 |
| BB | 1.00 | 1.00 | 1.00 | 1.00 |
| CC | 0.93 | 0.93 | 1.08 | 1.08 |
| DD | 0.55 | 0.55 | 1.82 | 1.82 |

The resistance of the path depends on the length, so that the relative resistances are in proportion to the relative path lengths, as indicated in the Table's columns RELATIVE LENGTH and RELATIVE RESISTANCE.

Current equals voltage divided by resistance, V/R, so that the relative currents will be inversely proportional to the relative path lengths, as indicated in the Table's column RELATIVE CURRENT.

The I-to-V amplifiers in FIG. 2 each produce a voltage which is proportional to its respective current. Thus, the voltage outputs of the I-to-V amplifiers have the relative magnitudes indicated in the rightmost column of Table 1.

The output voltage signals can be used to compute position of the stylus.

Errors in Position Computation

There are two primary sources of error in the computed stylus position. One is caused by the algorithm used, the other is caused by manufacturing irregularities in the tablet.

As to the algorithm, it is possible, in theory, to compute the stylus position to any desired degree of accuracy. However, in practice, a simple computation is used, and less accuracy is tolerated, in order to increase computational speed. Further, the reduction in accuracy is offset by error correction procedures, discussed later.

As to manufacturing irregularities, an example will illustrate one type of irregularity. The resistive surface in FIG. 2 is, in general, not perfectly uniform. Because of the non-uniformity, the resistances of the paths shown in FIG. 6 will not perfectly indicate the path lengths.

Thus, for example, assume that the two stylus positions shown in FIGS. 7 and 8 are symmetrical about the AXIS OF SYMMETRY. Because of the symmetry, each current path P1, P2, etc., in FIG. 7 is identical in physical length to its correspondent P1, P2, etc., in FIG. 8.

One would expect that the amplifiers (shown in FIG. 2) which receive current from paths of identical length would produce identical signals. That is, one would expect amplifier receiving path P1 in both FIGS. 7 and 8 to produce identical signals. However, because of the manufacturing irregularities, the amplifier signals are slightly different. The situations of FIGS. 7 and 8 do not produce mirror-image signals in the amplifiers.

Correction Table

To correct for these two errors, a correction table is used. In practice, for a digitizing tablet in the range of 8×8 inches, a common correction table is derived from a measured grid of 33×33 points. However, for illustration, a smaller grid (5×5) is shown in FIG. 9, superimposed upon a tablet 3. This smaller grid will be discussed.

To derive the correction table, a mechanical arm 21, shown in FIG. 10, moves the stylus 6 to each point on the grid. At each point, the digitizing tablet computes a position signal, and each computed position signal is recorded.

FIG. 11 shows a hypothetical collection of computed positions (the x's) and actual positions (the dots), in graphical form. (By "actual position" is meant that the mechanical arm exactly positions the stylus at each dot.) Table 2, below, summarizes the data shown graphically in FIG. 11, and illustrates one form of a correction table.

TABLE 2

| Point | Computed x | Computed y | Actual x | Actual y |
|---|---|---|---|---|
| 1 | 1.0 | 1.0 | 1.0 | 1.0 |
| 2 | 2.05 | 1.0 | 2.0 | 1.0 |
| 3 | 3.10 | 1.0 | 3.0 | 1.0 |
| 4 | 4.14 | 1.0 | 4.0 | 1.0 |
| 5 | 5.19 | 1.0 | 5.0 | 1.0 |
| 6 | 1.0 | 2.03 | 1.0 | 2.0 |
| 7 | 2.05 | 2.03 | 2.0 | 2.0 |
| 8 | 3.10 | 2.03 | 3.0 | 2.0 |
| 9 | 4.14 | 2.03 | 4.0 | 2.0 |
| 10 | 5.19 | 2.03 | 5.0 | 2.0 |
| 11 | 1.0 | 3.06 | 1.0 | 3.0 |
| 12 | 2.05 | 3.06 | 2.0 | 3.0 |
| 13 | 3.10 | 3.06 | 3.0 | 3.0 |
| 14 | 4.14 | 3.06 | 4.0 | 3.0 |
| 15 | 5.19 | 3.06 | 5.0 | 3.0 |
| 16 | 1.0 | 4.09 | 1.0 | 4.0 |
| 17 | 2.05 | 4.09 | 2.0 | 4.0 |
| 18 | 3.10 | 4.09 | 3.0 | 4.0 |
| 19 | 4.14 | 4.09 | 4.0 | 4.0 |
| 20 | 5.19 | 4.09 | 5.0 | 4.0 |
| 21 | 1.0 | 5.11 | 1.0 | 5.0 |
| 22 | 2.05 | 5.11 | 2.0 | 5.0 |
| 23 | 3.10 | 5.11 | 3.0 | 5.0 |
| 24 | 4.14 | 5.11 | 4.0 | 5.0 |
| 25 | 5.19 | 5.11 | 5.0 | 5.0 |

In Table 2, the "Point" column refers to the numbered points in FIG. 11. The "Computed x" and "Computed y" columns refers to the x- and y-coordinates computed by the digitizing tablet. The "Actual x" column refers to the actual x-coordinate of the stylus where the "Computed x" value was computed. The "Actual y" column refers to the actual y-coordinate of the stylus where the "Computed y" value was computed. The "Actual" values, of course, correspond to the dots in FIG. 11; the "Computed" values correspond to the x's.

How Table is Used, Simplified Explanation

FIG. 14 illustrates a simplified view of how the correction table is used. Assume that the stylus is located exactly at point 20. One first obtains the computed x and computed y signals.

One then locates the computed x and computed y entries in the TABLE. Arrow 27 indicates this step. One then locates the actual x and actual y data associated with these computed values. Arrow 28 indicates this step.

As arrow 29 indicates, these actual values indicate the actual position of point 20.

Actual Use of Table

In practice, for technical reasons which need not be explained here, the correction table of Table 2 is actually stored as two correction tables, each of which can be viewed as three-dimensional, as shown in FIG. 12. One table (shown as plot 33) stores the actual y values, as a function of the computed x and y values, while the other table (shown as plot 36) stores the actual x values, in a similar way.

To use the tables, one does the following:

1. Position the stylus on the tablet, and compute stylus position. Assume that the stylus is positioned exactly above dot 20 in FIG. 11. The computed position will be that indicated by the X adjacent dot 20, namely, x=5.19 and y=4.09. (This computed value is given in the row associated with point 20 in Table 2, above.)

2. From the computed x,y data, find the actual x,y data. FIG. 12 illustrates this procedure graphically.

In FIG. 12, the computed y value is indicated by line A, at the top of the Figure, which contains a replica of FIG. 11. The computed x value is indicated by line B. (The two-dimensional x,y plot, in the upper center of the Figure, forms base planes for the pair of three dimensional plots. The actual x, and actual y, values are plotted as functions of computed x, and computed y, in the three-dimensional plots.)

Lines A and B are used in plots 33 and 36 to ascertain the actual x,y values. Plot 33 indicates an actual y value of 4.0, while plot 36 indicates an actual x value of 5.0, corresponding to the Table 2 data for point 20, and to FIG. 11.

In practice, the procedure used is slightly more complicated. Based on the computed (x,y) values, one obtains several computed (x,y) values from each of the correction tables. For example, the computed value may indicate point P in FIG. 14. One retrieves the computed (x,y) data for the four points which bracket point P, namely, those for points 8, 9, 13, and 14.

One interpolates between these four points, in order to derive the actual position indicated by the point P.

Optimization Problem

The inventors have found that, in some types of digitizing tablets, the correction table occupies approximately 2048 bytes (or 2K bytes, nominal) of memory. This amount of memory, of itself, is not large. However, for various technical reasons, which need not be elaborated here, the memory hardware generally used to store the table is serial-type, rather than Random-Access Memory (RAM).

The serial memory is not suitable for access by a processor which seeks to utilize the table for computation, and which requires RAM for good performance. Consequently, in use, the table is copied into a section of RAM for use by the processor.

Reducing the size of the correction table will not only reduce the size of the serial memory, but will also reduce the size of the RAM into which the table is copied. This RAM is somewhat expensive.

In addition, reducing the amount of data to be copied into the RAM will save some time, and reduce the amount of error-checking required in the copying operation.

Further, RAM occupies a somewhat large amount of physical space on an integrated circuit (IC). Reducing RAM reduces this space, and allows a smaller IC to be used.

Still further, RAM consumes battery power. Reducing RAM reduces this consumption, and increases battery life.

Further yet, assume, for simplicity, that the defect rate in manufacturing of RAM is independent of RAM size, and is a fixed probability, such 1 defect per x transistors, where x is some large number such as 10,000, 100,000, or the like. If RAM is made smaller, then the number of transistors is reduced. The probability of finding an unacceptable number of defects becomes reduced, and the yield of the manufacturing process increases.

OBJECTS OF THE INVENTION

An object of the invention is to provide compression of a correction table used by a digitizing tablet.

SUMMARY OF THE INVENTION

In one form of the invention, a correction table for a digitizing tablet is compressed, in order to reduce the memory space which it occupies. The compressed table is stored within the tablet, or associated device.

BRIEF DESCRIPTION OF THE DRAWINGS

FIGS. 18 and 19 illustrate definitions of ROWS and columns (COL).

FIG. 20 illustrates how, in each row, the first-column values can be significantly less than the last-column values.

FIG. 21 illustrates the division of the correction table into segments of equal size, but wherein the segments span more than one row.

DETAILED DESCRIPTION OF THE INVENTION

In one form of the invention, a Rice-type compression of the correction table is used. In other forms of the invention, modifications are added.

Rice-Type Compression

The Rice compression procedure is known in the art, and has been applied to transmission of video images from spacecraft. The following references describe the Rice algorithm, and are hereby incorporated by reference:

1. R. F. Rice, P. S. Yeh, and W. H. Miller, "Algorithms for a Very High Speed Universal Noiseless Coding Module," JPL Publication Office, Mail Stop 111–130, Pasadena, Calif., 91109, Feb. 15, 1991.
2. R. F. Rice and J. R. Plaunt, "Adaptive Variable Length Coding for Efficient Compression of Spacecraft Television Data," *IEEE Transactions on Communication Technology*, vol. COM-19, part 1, pp. 889–897, December, 1971.
3. R. F. Rice, "Some Practical Universal Noiseless Coding Techniques," *JPL Publication* 79–22, Jet Propulsion Laboratory, JPL Publications Office, Mail Stop 111–130, Pasadena, Calif., 91109, Mar. 15, 1979.
4. - - - , "Practical Universal Noiseless Coding," in *Proceedings* 1979 *Society of Professional and Industrial Engineers Symposium*, vol. 207, San Diego, Calif. August, 1979.
5. J. Venbrux, P. S. Yeh, and M. N. Liu, "A VLSI Chip Set for High-Speed Lossless Data Compression," *IEEE Transaction on Circuits and Systems for Video Technology*, vol. 2, no. 4, pp. 381–391, December, 1992.

Overview of Rice Procedure

Figure 12:
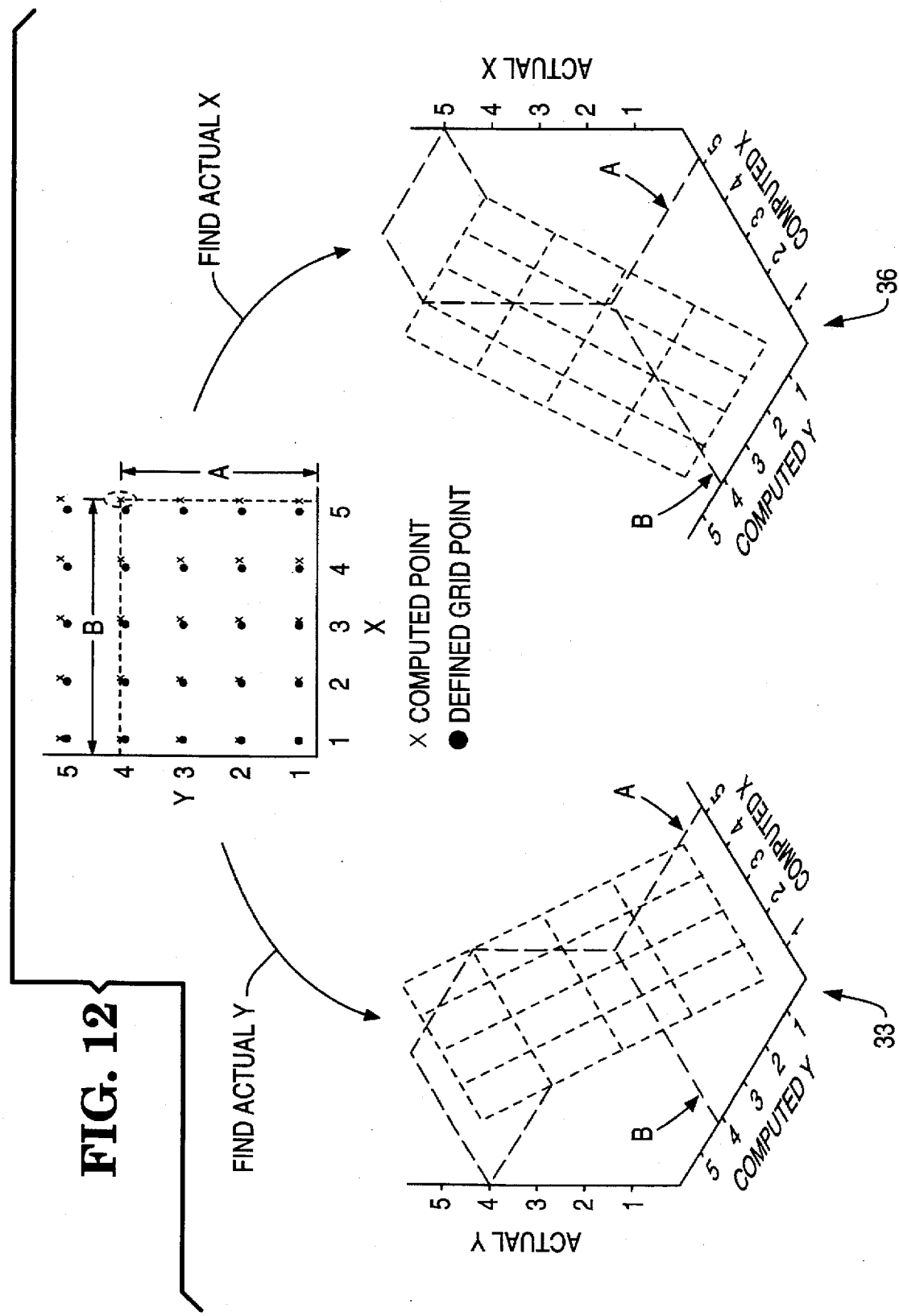
FIG. 12 illustrates, graphically, one concept behind deriving actual stylus position from measured position, using a correction table.
Figure 15:
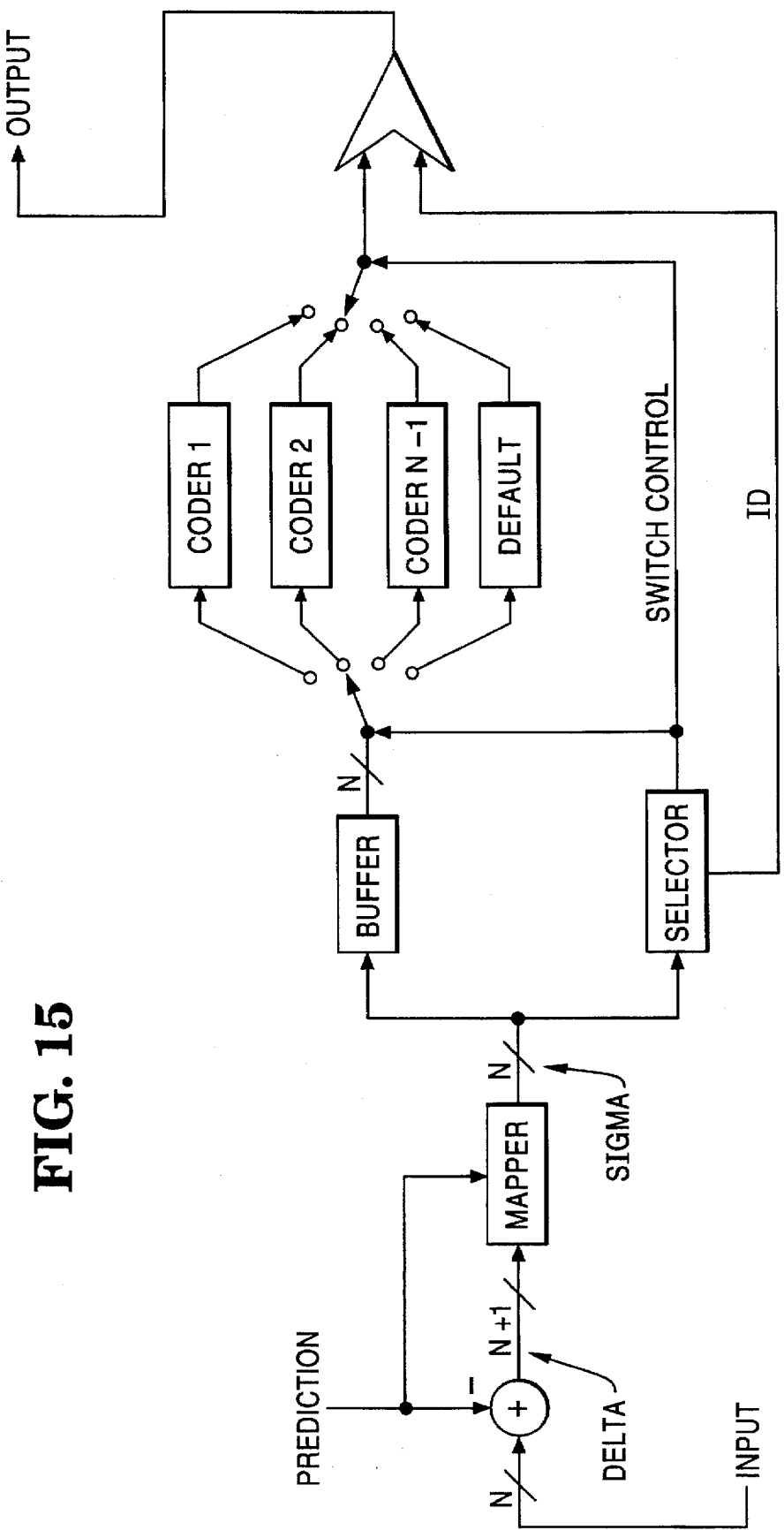
FIG. 15 is a block diagram illustrating the Rice compression algorithm.

FIG. 15 is a block diagram illustrating the Rice procedure. A sample is applied to the "Input." A sample is one element in the correction table, such as the computed x,y values in Table 2, above. As discussed above, in connection with FIG. 12, two correction tables are used (one for the x-coordinate, and one for the y-coordinate). The Rice procedure is applied to each.

In the Rice procedure, the first step is to subtract a predictor from the INPUT, indicated by the subtraction of "Prediction," thereby producing a DELTA. Assume that the sample values are as shown in the 5×5 matrix given in Table 3:

TABLE 3

| ROW 1: | 1 | 6 | 5 | 10 | 15 |
|---|---|---|---|---|---|
| ROW 2: | 9 | 4 | 7 | 12 | 12 |
| ROW 3: | 14 | 8 | 0 | 9 | 2 |
| ROW 4: | 5 | 3 | 13 | 11 | 4 |
| ROW 5: | 10 | 7 | 9 | 3 | 1 |

Taking row 1, and, for simplicity of example, assuming a constant PREDICTOR of 6, one obtains DELTAS as shown in Table 4:

TABLE 4

| ROW 1: | 1 | 6 | 5 | 10 | 15 |
|---|---|---|---|---|---|
| DELTA: | −5 | 0 | −1 | 4 | 9 |

One way to obtain SIGMAS, used in the Rice Algorithm, from the DELTAS is to follow four rules, given in Table 5:

TABLE 5

1. If DELTA is equal to or greater than ZERO AND IF DELTA is equal to or less than the PREDICTOR, then SIGMA = 2 × DELTA.
2. If DELTA is greater than the PREDICTOR, then SIGMA = SAMPLE.

TABLE 5-continued

3. IF DELTA is equal to or greater than (PREDICTOR − MAX) AND IF DELTA is less than ZERO, then SIGMA = (2 × ABSOLUTE VALUE OF DELTA) − 1.
4. IF (PREDICTOR − MAX) is greater than DELTA, then SIGMA = (MAX − SAMPLE).

In this table, MAX is the largest number representable in the computing and storage element. In this example, MAX equals $2^4-1$, or 15.

Applying these rules to the SAMPLES of ROW 1 produces the SIGMAS of Table 6:

TABLE 6

| ROW 1: | 1 | 6 | 5 | 10 | 15 |
|---|---|---|---|---|---|
| DELTA: | −5 | 0 | −1 | 4 | 9 |
| SIGMA: | 9 | 0 | 1 | 8 | 15 |

Table 6, contains five columns.

The SIGMA of column 1 (i.e., SIGMA of 9) is obtained by Rule 3.

The SIGMA of column 2 (i.e., SIGMA of 0) is obtained by Rule 1.

The SIGMA of column 3 (i.e., SIGMA of 1) is obtained by Rule 3.

The SIGMA of column 4 (i.e., SIGMA of 8) is obtained by Rule 1.

The SIGMA of column 5 (i.e., SIGMA of 15) is obtained by Rule 2.

These SIGMAS are now written in binary format, in order to illustrate the subsequent processing.

TABLE 7

| SIGMA (Decimal) | SIGMA (Binary) |
|---|---|
| 9 | 1001 |
| 0 | 0000 |
| 1 | 0001 |
| 8 | 1000 |
| 15 | 1111 |

The next step is to try all possible comma codes (which will be explained shortly) on the group of five SIGMAS, and pick the comma code which produces the most compact storage of the SIGMAS. Comma coding will be explained by an example.

Table 8 illustrates the comma codes for several decimal numbers.

TABLE 8

| DECIMAL NUMBER | COMMA CODING |
|---|---|
| 1 | 0 followed by 1: 01 |
| 2 | 00 followed by 1: 001 |
| 3 | 000 followed by 1: 0001 |
| 4 | 0000 followed by 1: 00001 |
| 10 | ten 0's followed by 1: 00000 00000 1 |

The general procedure for comma coding is this:
1. Find the decimal number.
2. Write that many ZEROES.
3. Terminate with a ONE. The ONE acts as a comma.

Thus, for example, the following sequence of ONES and ZEROES, in comma-coded binary, corresponds to the decimal sequence 4, 7, 3, 2, 5:

.... 00001 00000001 0001 001 000001 ....

That is, the first number includes four ZEROES, followed by a ONE, corresponding to decimal 4.

The second number includes seven ZEROES, followed by a ONE, corresponding to decimal 7, and so on.

The spaces are added for readability. In a binary data stream, the spaces do not exist.

The SIGMAS are processed, using comma codes, according to the following procedure.

First, all SIGMAS are converted to con, ha codes (CC), and the total number of bits contained in the comma codes is computed, as shown in Table 9. This represents one trial.

Next, the single Least Significant Bit (LSB) is removed from each SIGMA, leaving the Most Significant Bits (MSBs). The number of bits required for the comma-coded MSBs, plus the removed LSBs, is computed, as in Table 10. This represents the second trial.

Next, two LSBs are removed from each SIGMA. The number of bits required for the MSBs, plus the removed LSBs, is computed, as in Table 11. This represents the third trial.

No trial is done with just one MSB. Instead, the next and final trial uses 0 MSBs, which simply produces the uncompressed data itself. Results for the fourth trial are in Table 12.

TABLE 9

ZEROth COMMA CODE TEST: ID = 0

| SIGMA (Decimal) | SIGMA (Binary) | 4 MSBs | LSB | Comma Code | # Bits in CC | # Bits in LSB |
|---|---|---|---|---|---|---|
| 9 | 1001 | 1001 | — | 0000000001 | 10 | 0 |
| 0 | 0000 | 0000 | — | 1 | 1 | 0 |
| 1 | 0001 | 0001 | — | 01 | 2 | 0 |
| 8 | 1000 | 1000 | — | 000000001 | 9 | 0 |
| 15 | 1111 | 1111 | — | 00000 00000 00000 1 | 16 | 0 |
| | | | | Bits total: | 38 | 38 + 0 |

TABLE 10

FIRST COMMA CODE TEST: ID = 1

| SIGMA (Decimal) | SIGMA (Binary) | 3 MSBs | LSB | Comma Code | # Bits in CC | # Bits in LSB |
|---|---|---|---|---|---|---|
| 9 | 1001 | 100 | 1 | 00001 | 5 | 1 |
| 0 | 0000 | 000 | 0 | 1 | 1 | 1 |
| 1 | 0001 | 000 | 1 | 1 | 1 | 1 |
| 8 | 1000 | 100 | 0 | 00001 | 5 | 1 |
| 15 | 1111 | 111 | 1 | 00000 001 | 8 | 1 |
| | | | | Bits total: | 25 | 20 + 5 |

TABLE 11

SECOND COMMA CODE TEST: ID = 2

| SIGMA (Decimal) | SIGMA (Binary) | 4 MSBs | LSBs | Comma Code | # Bits in CC | # Bits in LSB |
|---|---|---|---|---|---|---|
| 0 | 1001 | 10 | 01 | 001 | 3 | 2 |
| 0 | 0000 | 00 | 00 | 1 | 1 | 2 |
| 1 | 0001 | 00 | 01 | 1 | 1 | 2 |
| 8 | 1000 | 10 | 00 | 001 | 3 | 2 |
| 15 | 1111 | 11 | 11 | 0001 | 4 | 2 |
| | | | | 22 Bits total: | 12 + | 10 |

TABLE 12

THIRD COMMA CODE TEST: ID = 3

| SIGMA (Decimal) | SIGMA (Binary) | 4 MSB | LSBs | Comma Code | # Bits in CC | # Bits in LSB |
|---|---|---|---|---|---|---|
| 9 | 1001 | — | 1001 | — | 0 | 4 |
| 0 | 0000 | — | 0000 | — | 0 | 4 |
| 1 | 0001 | — | 0001 | — | 0 | 4 |
| 8 | 1000 | — | 1000 | — | 0 | 4 |
| 15 | 1111 | — | 1111 | — | 0 | 4 |
| | | | | 20 Bits total: | 0 + | 20 |

The four bit totals, one from each test, are then compared, as in Table 13.

TABLE 13

| Comma Code Test No. | Total bits |
|---|---|
| 0 | 38 |
| 1 | 25 |
| 2 | 22 |
| 3 | 20 (smallest) |

Table 13 indicates that test number 3 allows storage of the SIGMAS using the fewest bits. The encoding of test 3 (in Table 12) is thus used for the group of SIGMAS. (For this sample, no compression is undertaken, the "final trial" data is used directly.)

Using this encoding, the following data is stored, which represents the five SIGMAS:

1) The ID number, e.g., 11 (binary), which tells which encoding scheme was used, so that reconstruction can be done.

2) For each SIGMA, the Comma Code plus the split-off LSBs. The Comma Code allows reconstruction of the MSBs given in the "MSB" column of the Tables. The split-off LSBs are then appended to the reconstructed MSBs.

Specifically, in this example, the stored data representing the SIGMAs is the sequence listed in the "Data" column, below (the Comments, of course, are not stored):

| Data (Binary) | Comment |
|---|---|
| 11 | This is the ID number. It identifies encoding scheme. 11 (decimal 3) indicates ID = 3, thereby referring to Table 12, which contains this ID. |
| 1001 | (For SIGMA = 9.) There is no CC. 1001 represents the four-digit split-off LSBs. |

-continued

| Data (Binary) | Comment |
|---|---|
| 0000 | (For SIGMA = 0.) There is no CC. 0000 represents the four-digit split-off LSBs. |
| 0001 | (For SIGMA = 1.) There is no CC. 0001 represents the four-digit split-off LSBs. |
| 1000 | (For SIGMA = 8.) There is no CC. 1000 represents the four-digit split-off LSBs. |
| 1111 | (For SIGMA = 15.) There is no CC. 1111 represents the four-digit split-off LSBs. |

As another example, if the data were stored according to ID=(Table 11), it would be stored as follows (again, the Comments are not stored).

| Data (Binary) | Comment |
|---|---|
| 10 | The ID number: identifies encoding scheme. |
| 001 01 | (For SIGMA = 9.) 001 is the CC. 01 represents the two-digit split-off LSBs. |
| 1 00 | (For SIGMA = 0.) 1 is the CC. 00 represents the two-digit split-off LSBs. |
| 1 01 | (For SIGMA = 1.) 1 is the CC. 01 represents the two-digit split-off LSBs. |
| 001 00 | (For SIGMA = 8.) 001 is the CC. 00 represents the two-digit split-off LSBs. |
| 0001 11 | (For SIGMA = 15.) 001 is the CC. 11 represents the two-digit split-off LSBs. |

This compression procedure is repeated for each row of both correction tables. The compressed data is stored in memory within the digitizing tablet.

Translating the Compressed Data

Recovery of the SIGMAs from the stored CCs and LSBs, stored within the compressed correction table, is straightforward. For example, in Table 11, the data 00101 (referring to the SIGMA of 9), together with the ID code of 10 (indicating that the Second Comma Coding was used), allows recovery of the SIGMA as follows. The ID code indicates that two LSBs are used. Thus, since the number of bits used per raw data point is four, then 4−2=2 MSBs used. In other words, from the ID one can tell the number of LSBs directly. One uses both the ID and the bit-width of the data to compute the number of MSBs.

The CC of 001 corresponds to the number 2 decimal, which is represented by (2 MSB bits) 10 binary. The LSBs follow and are given directly, as 01. Appending the LSBs to the MSBs gives 1001, corresponding to the SIGMA of 9, decimal.

Therefore, in one form of the invention, a correction table is compressed according to the Rice compression scheme, and stored within a digitizing tablet, or within associated equipment. The Rice approach is not required, and other compression techniques, known in the art, or developed in the future, can be used.

Other Embodiments

1. Plane Removal

Figure 1:
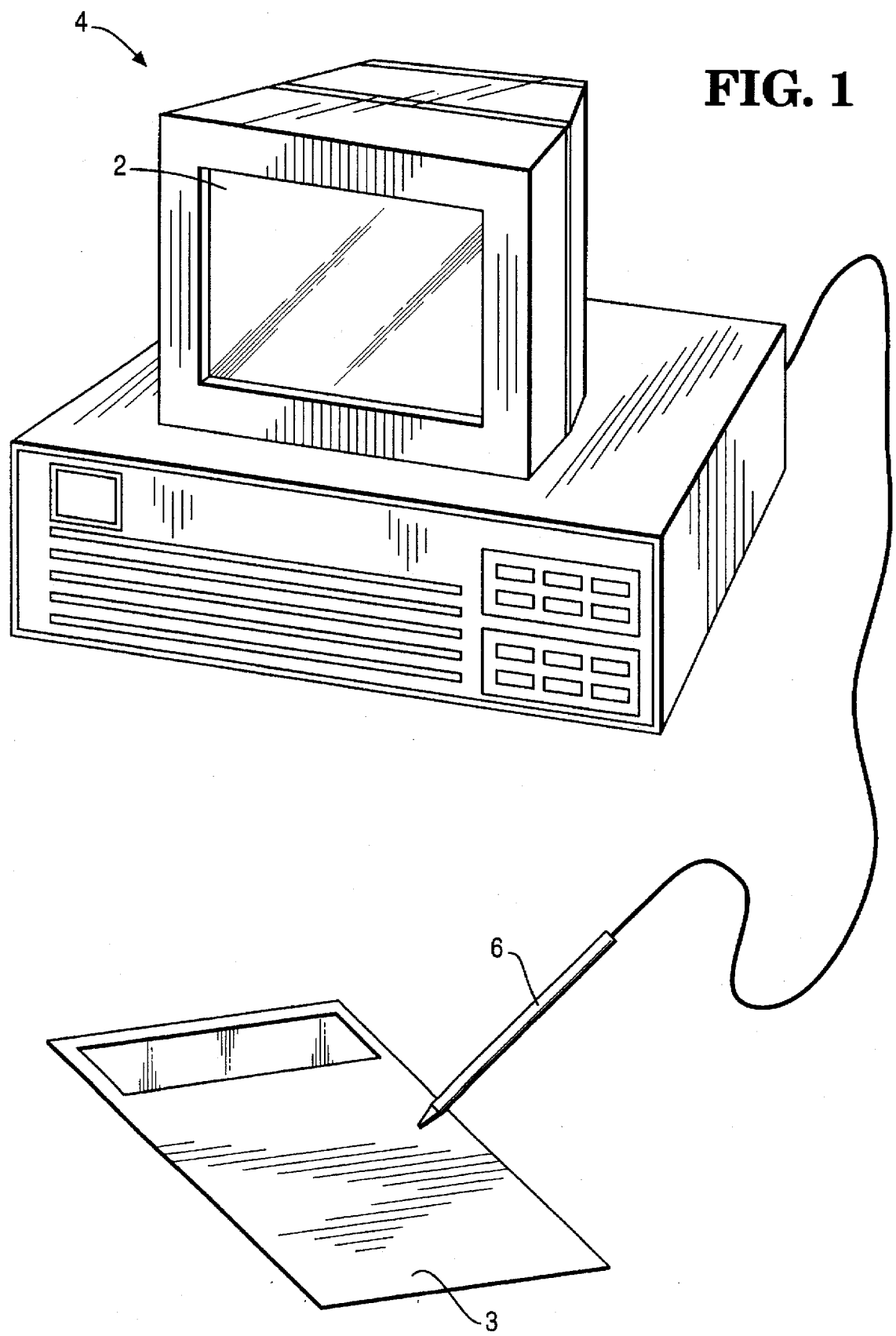
FIG. 1 illustrates a computer and a digitizing tablet.
Figure 2:
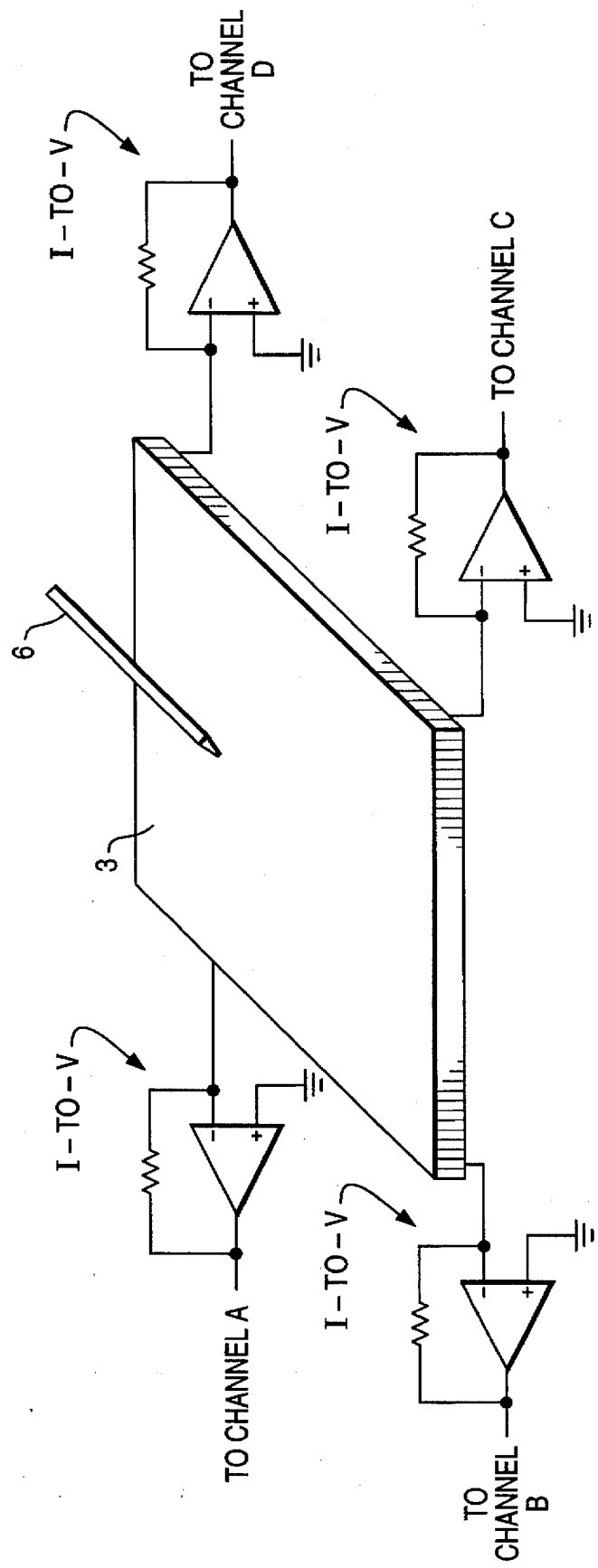
FIG. 2 illustrates a digitizing tablet 3, and its current-to-voltage amplifiers, labeled "I-to-V."
Figure 3:
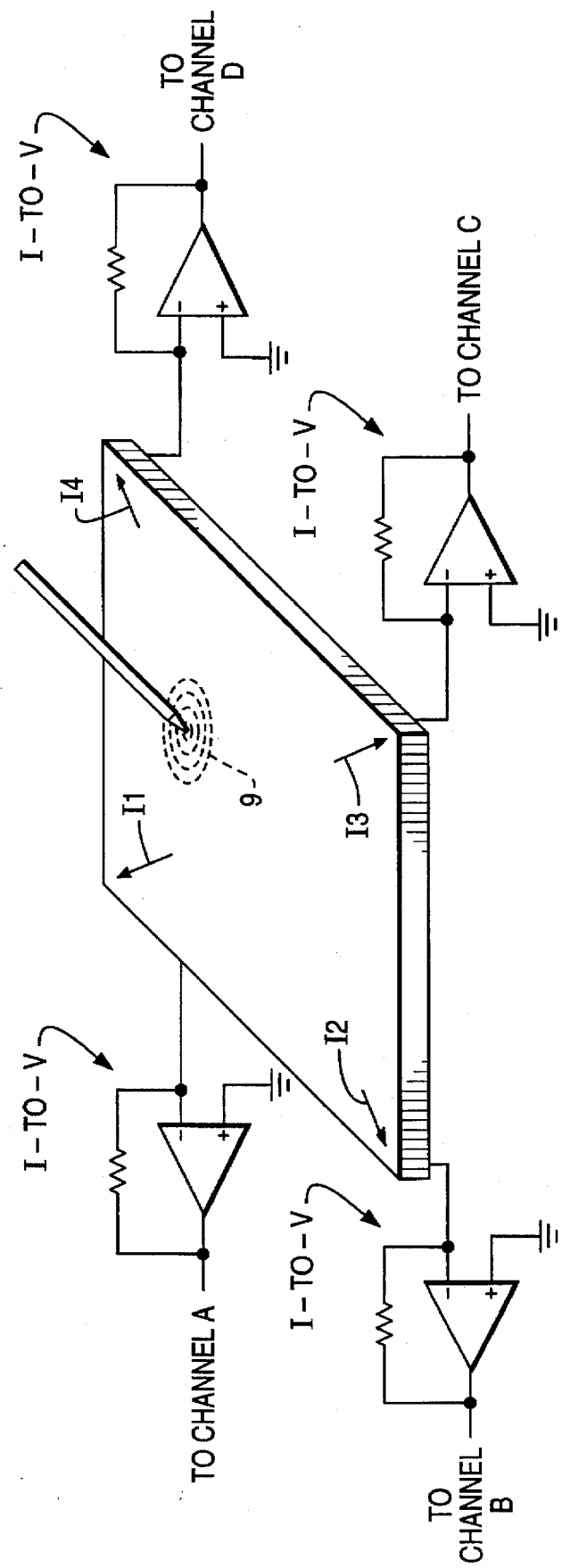
FIG. 3 illustrates a signal 9 produced by the stylus 6 of FIG. 2.
Figure 4:
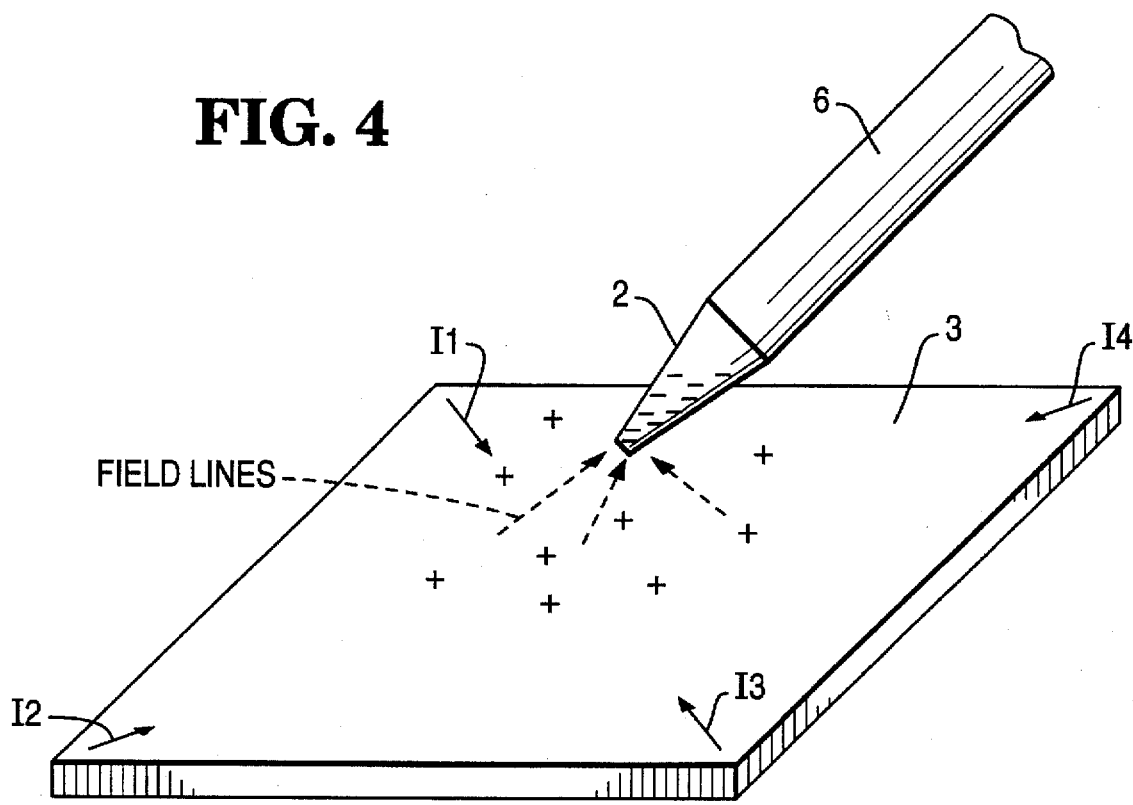
FIGS. 4 and 5 illustrate currents I1, I2, I3, and produced by the stylus 6.
Figure 5:
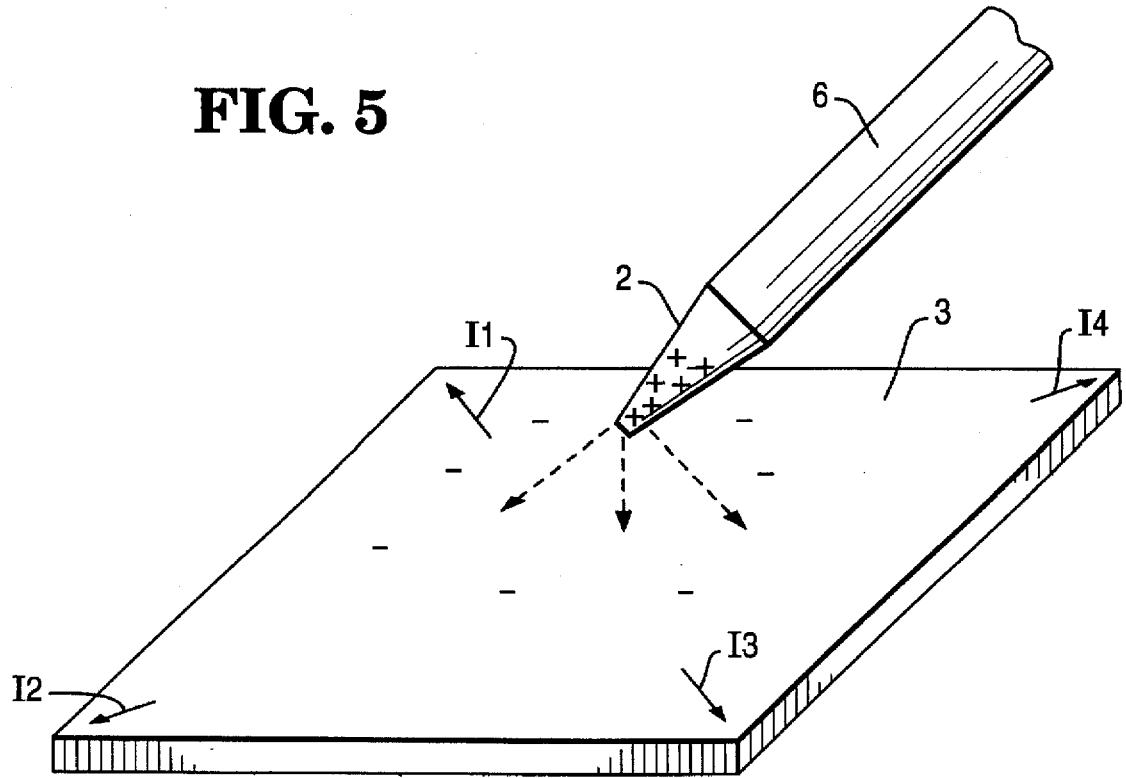
Figure 6:
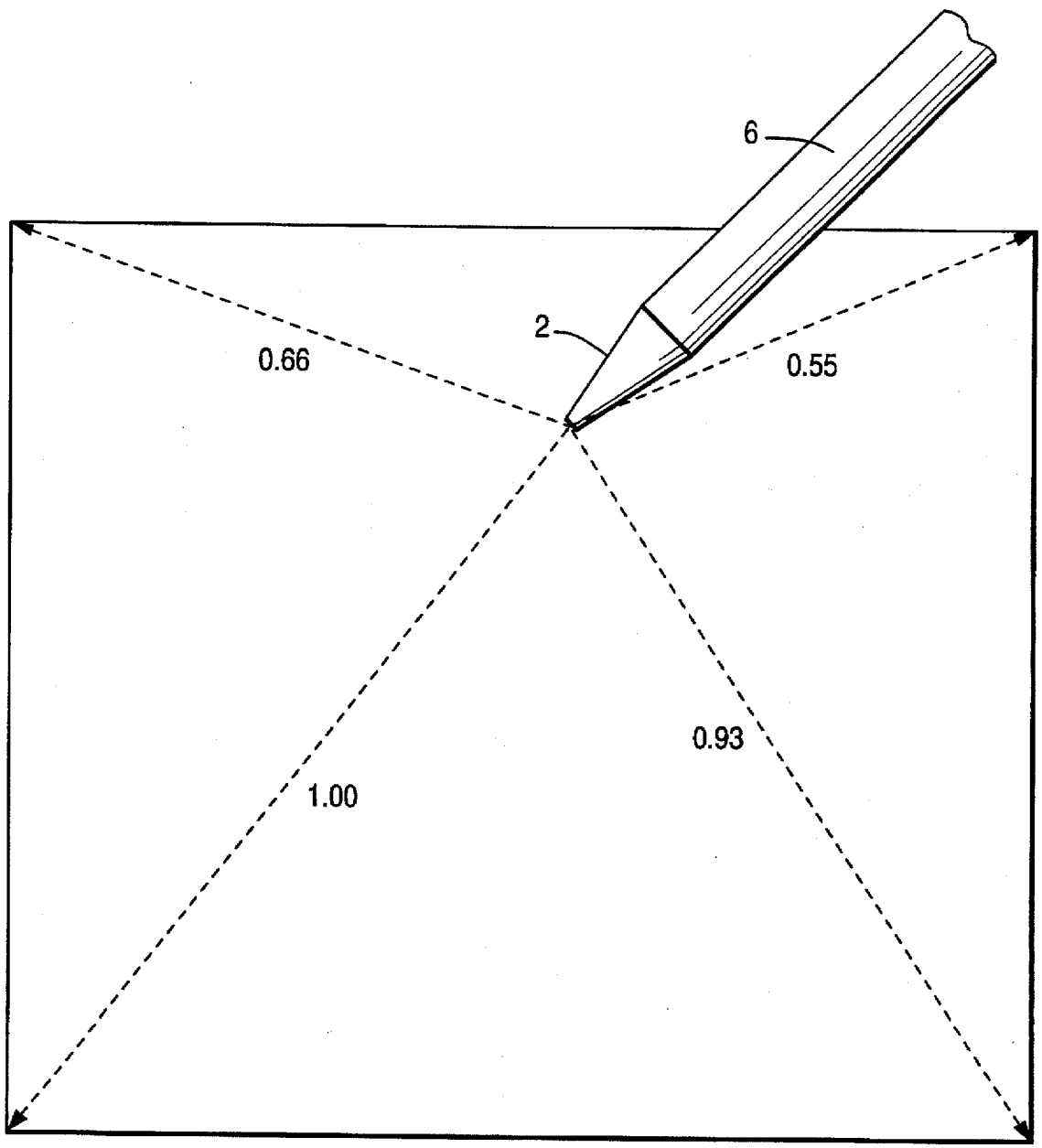
FIG. 6 illustrates idealized current paths taken by currents I1, I2, I3, and I4.
Figure 7:
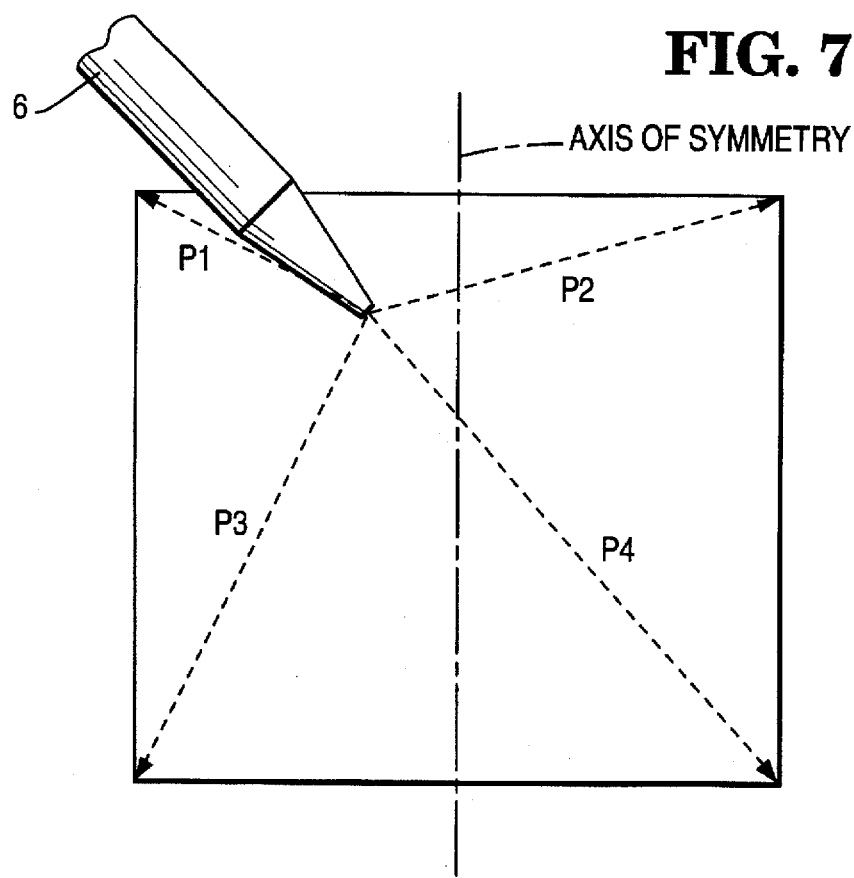
FIGS. 7 and 8 illustrate symmetrical current paths, based on two stylus positions.
Figure 8:
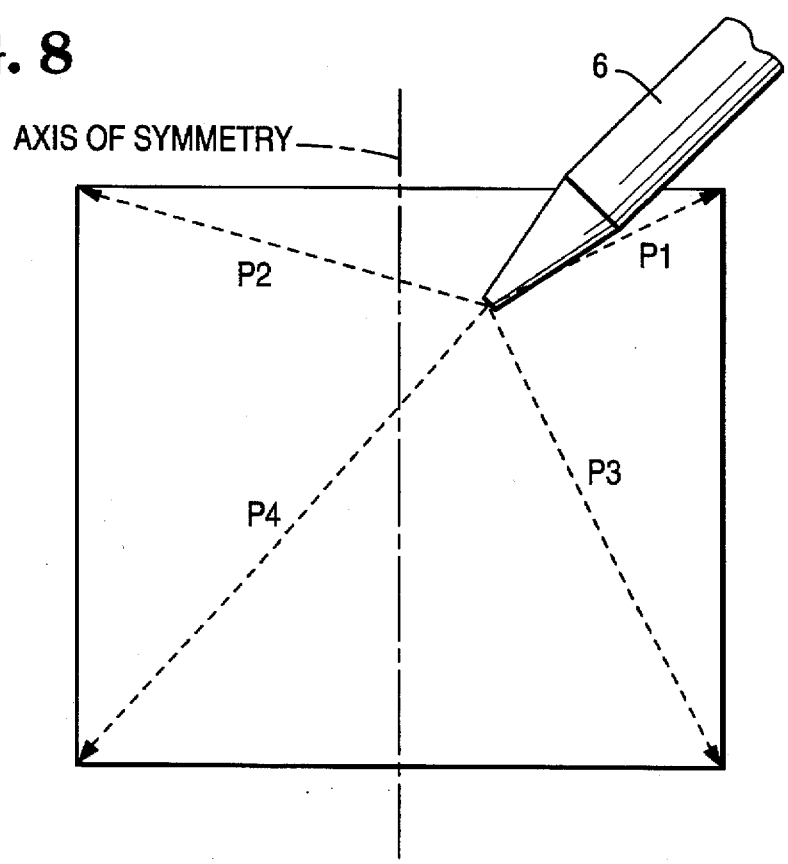
Figure 9:
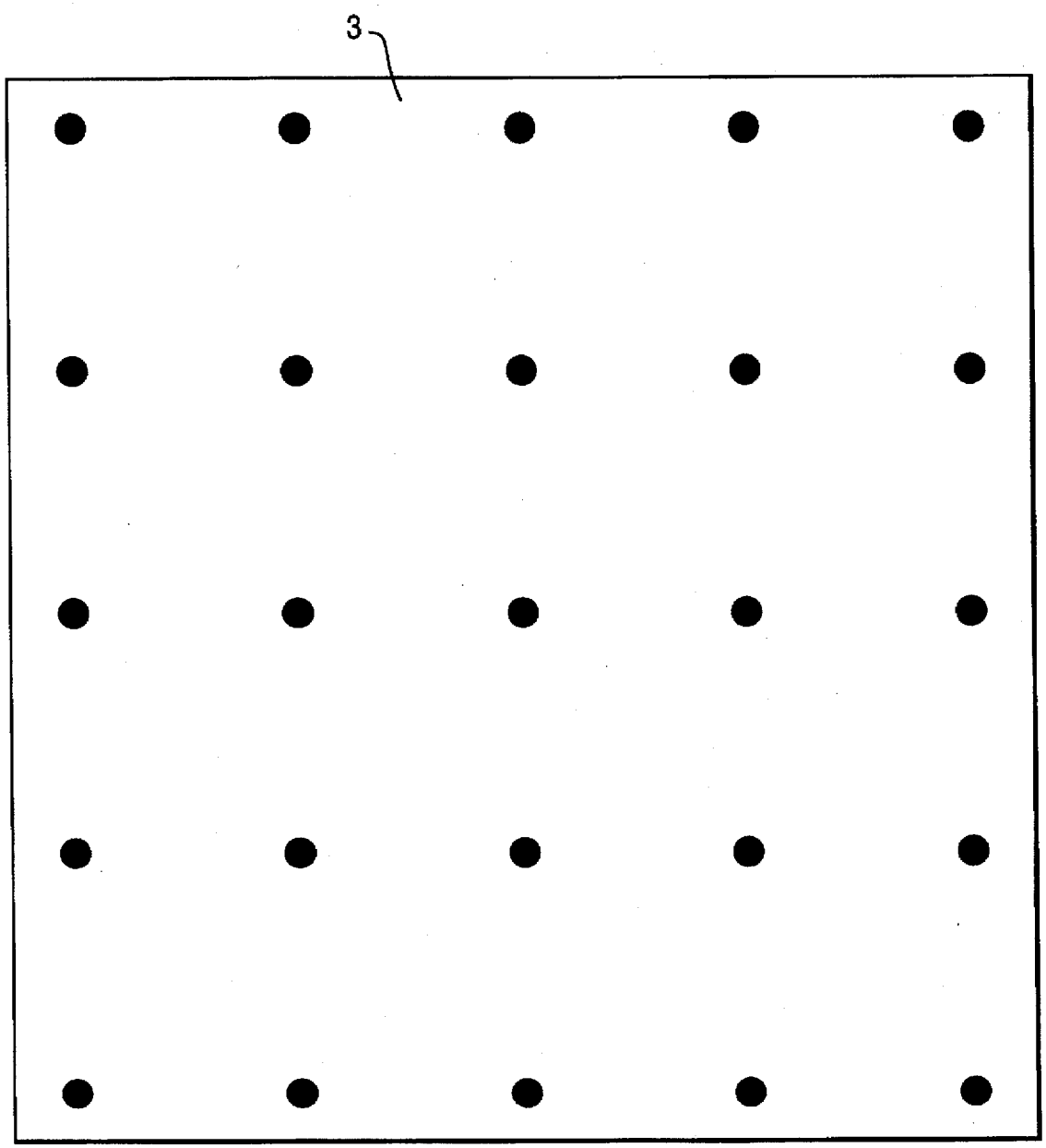
FIG. 9 illustrates a simplified 5×5 reference grid, superimposed upon the digitizing tablet 3.
Figure 10:
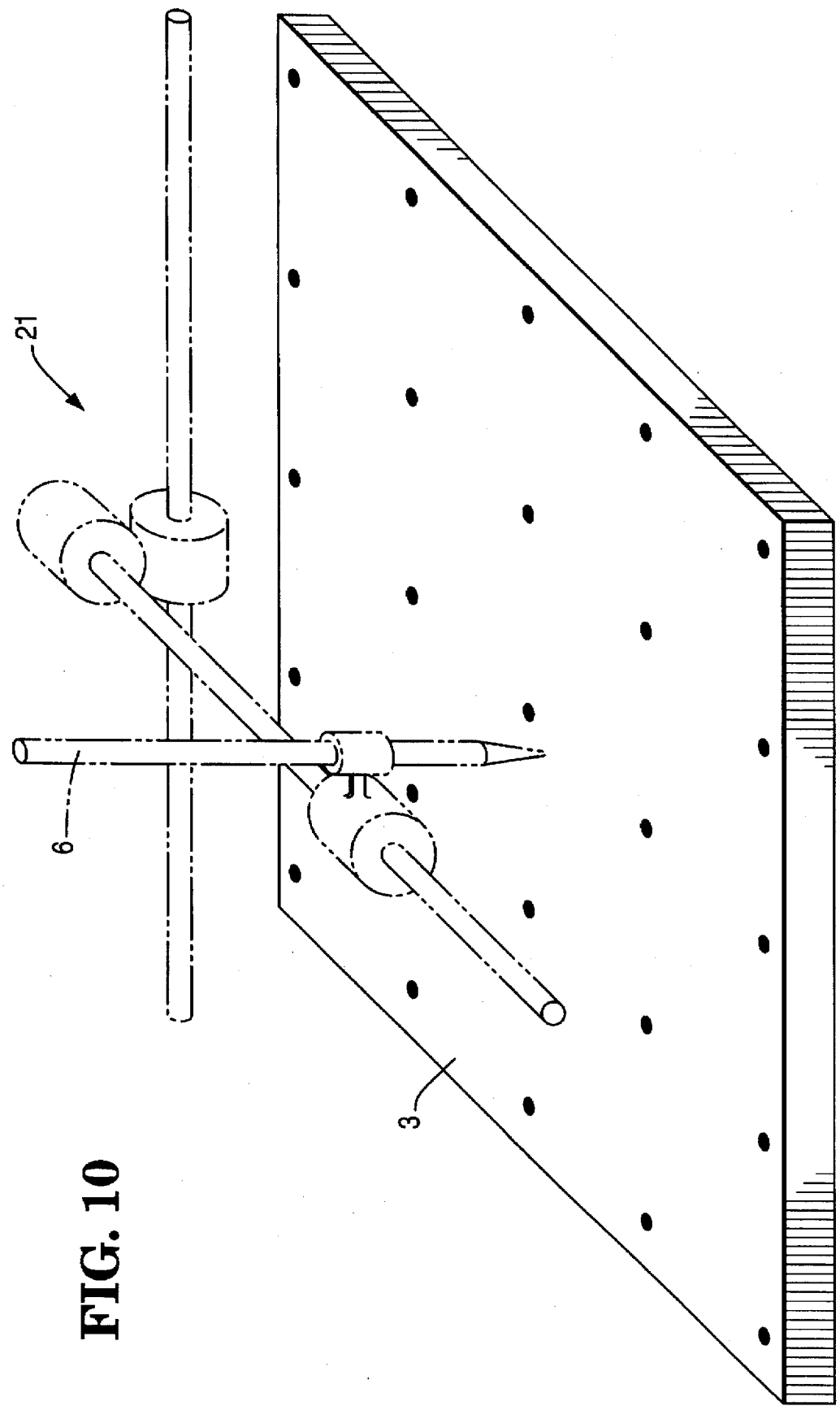
FIG. 10 illustrates a mechanical arm 21 which moves the stylus 6 across the reference grid.
Figure 11:
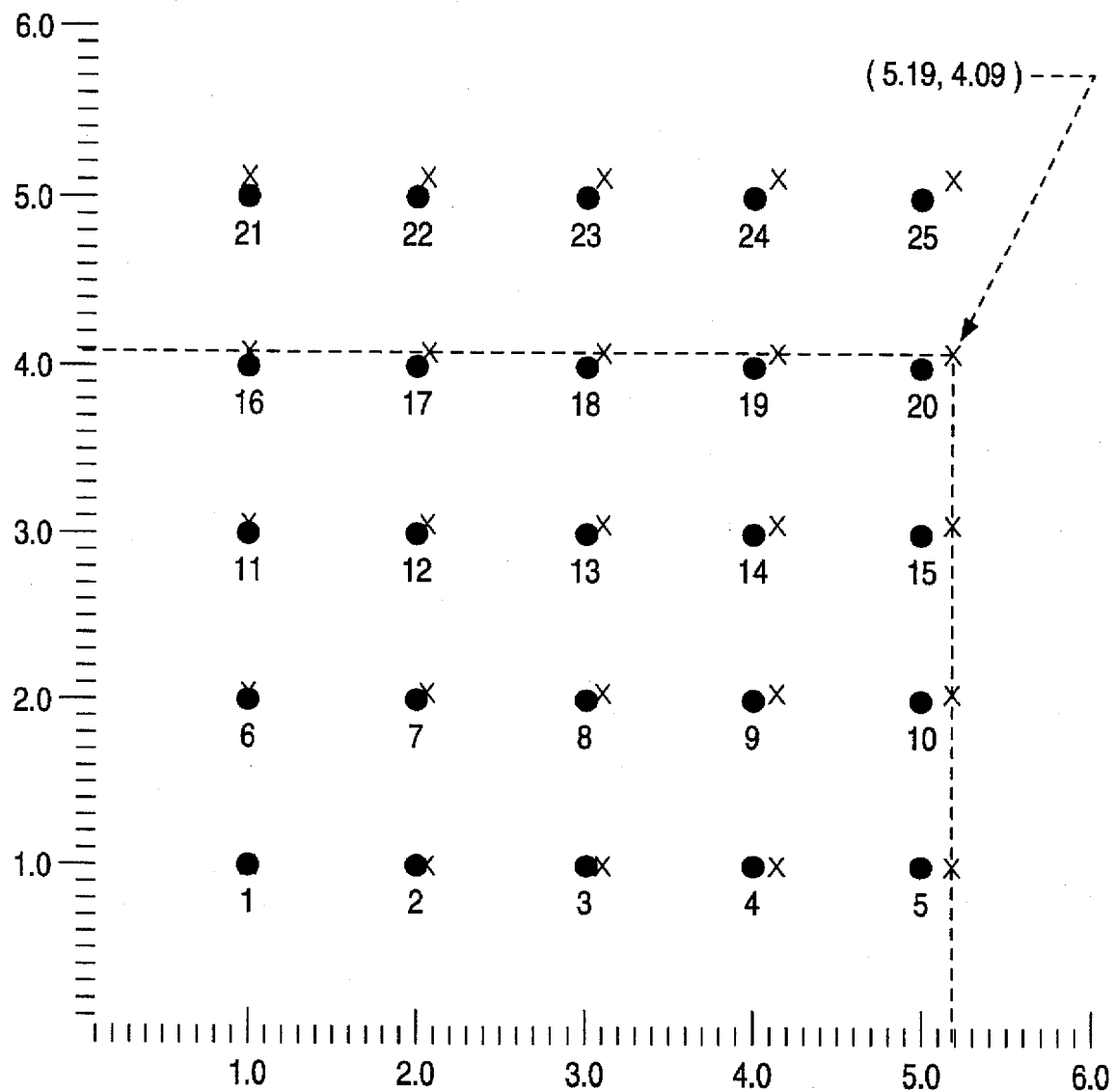
FIG. 11 illustrates reference positions (the dots) and computed positions (the x's) of the stylus (not shown), which deviate from the reference positions.
Figure 13A:
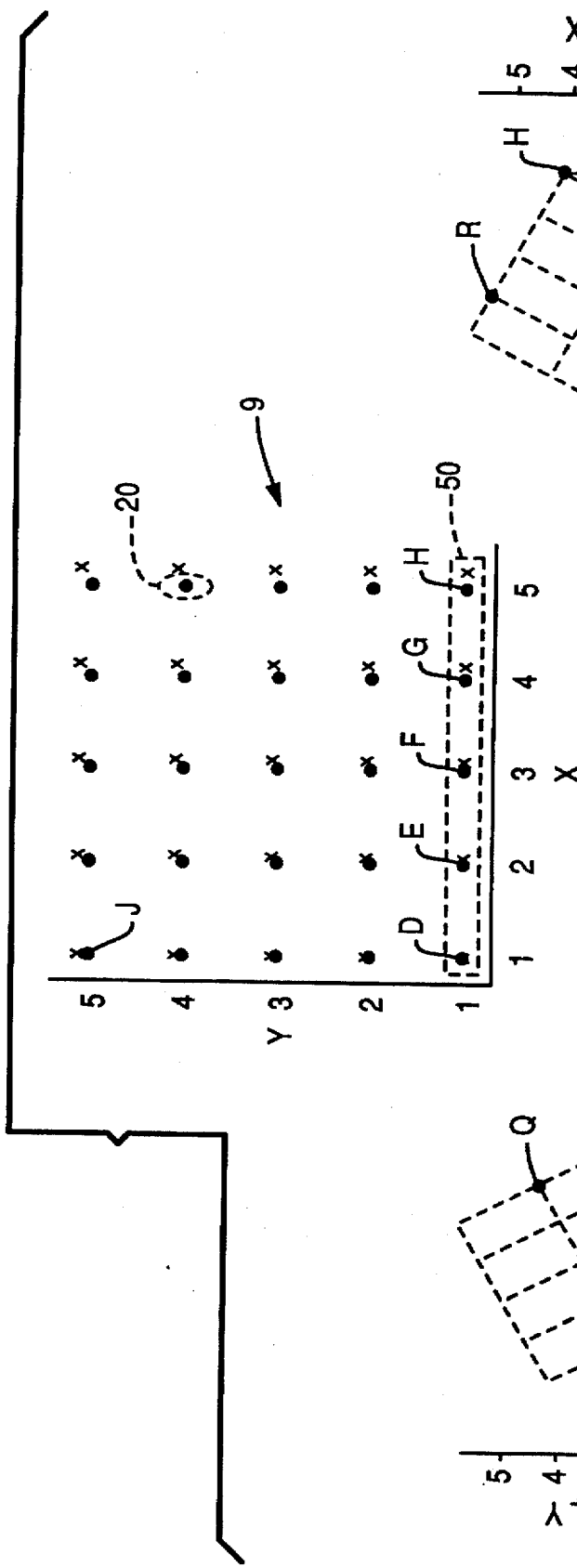
FIGS. 13A, 13B and 13C repeats some of the information in FIG. 12.
Figure 13B:
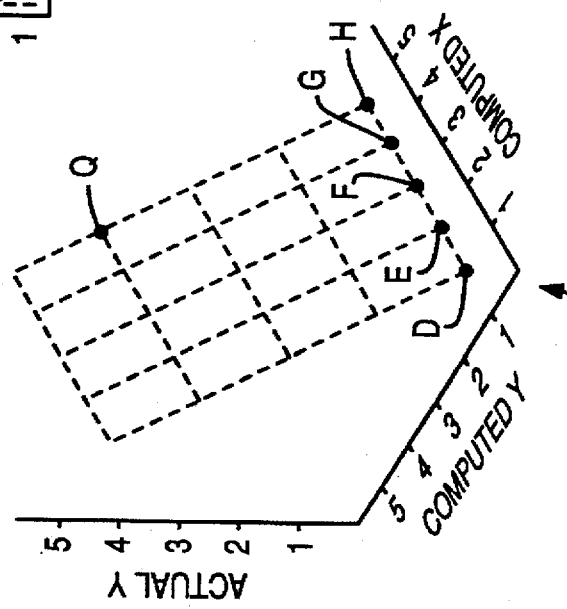
Figure 13C:
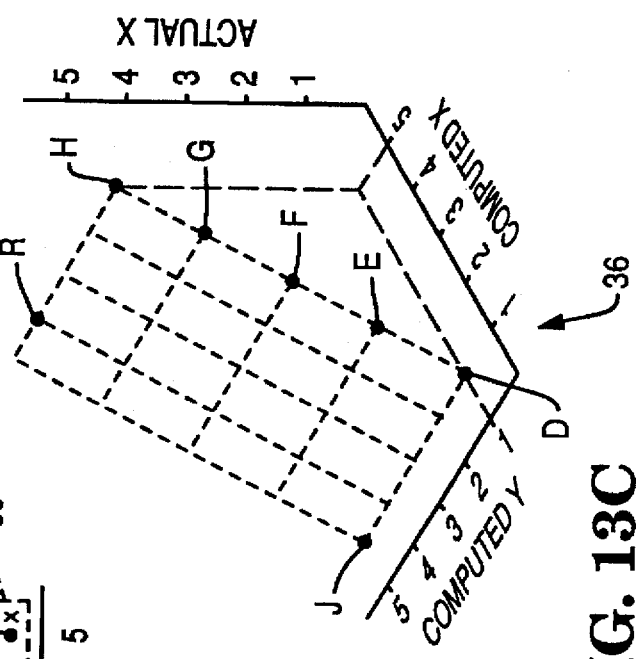
Figure 14:
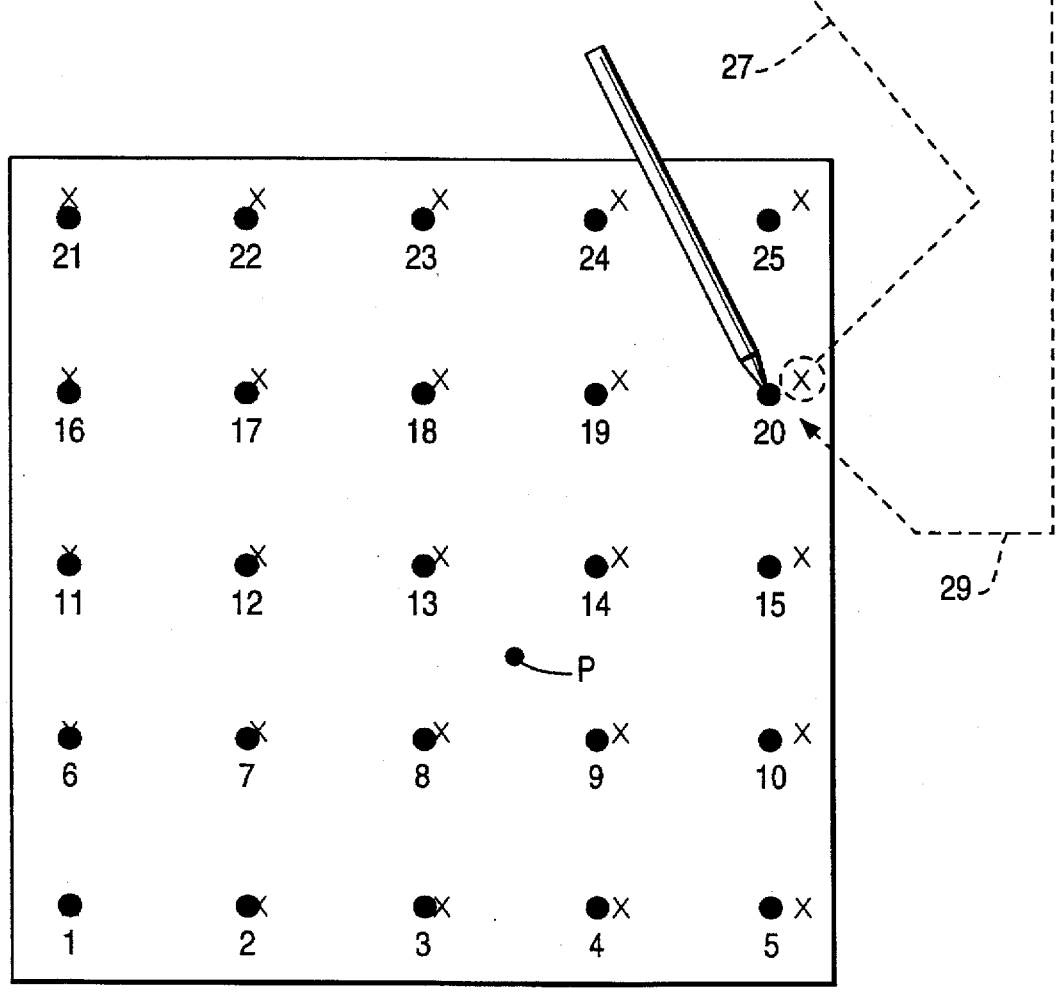
FIG. 14 illustrates, in simplified form, deriving actual stylus position from measured stylus position.

The inventors have found that the data shown in FIG. 11, when plotted in three-dimensions, tends to resemble geometric planes, as shown by plots 33 and 36 in FIGS. 13B and 13C. An example will explain how plots 33 and 36 are derived from the data of FIG. 11, shown in FIG. 13A, and labeled "9".

EXAMPLE

For point 20 in FIG. 11, enclosed in a dashed circle in FIG. 13A, the computed (x,y) values are (5.19, 4.09), as indicated in FIG. 11. The actual (x,y) values for this point are (5.0, 4.0).

In plot 33 in FIG. 13B, for point 20, one plots the actual y value (4.0), on the vertical axis, at the computed (x,y) value (i.e., 5.19, 4.09), giving point Q.

In plot in FIG. 13C, for point 20, one plots the actual x value (5.0), on the vertical axis, at the computed (x,y) value (i.e., 5.19, 4.09), giving point R. All points in grid 9 are plotted in this manner, thereby producing plots 33 and 36.

Of course, the planes shown in plots 33 and 36 only approximate the plotted data.

This plane-resemblance allows a pre-compression, prior to the Rice compression. An example will illustrate the pre-compression, using two-dimensional data for simplicity.

Example of Pre-Compression, using Plane Subtraction

Figure 16:
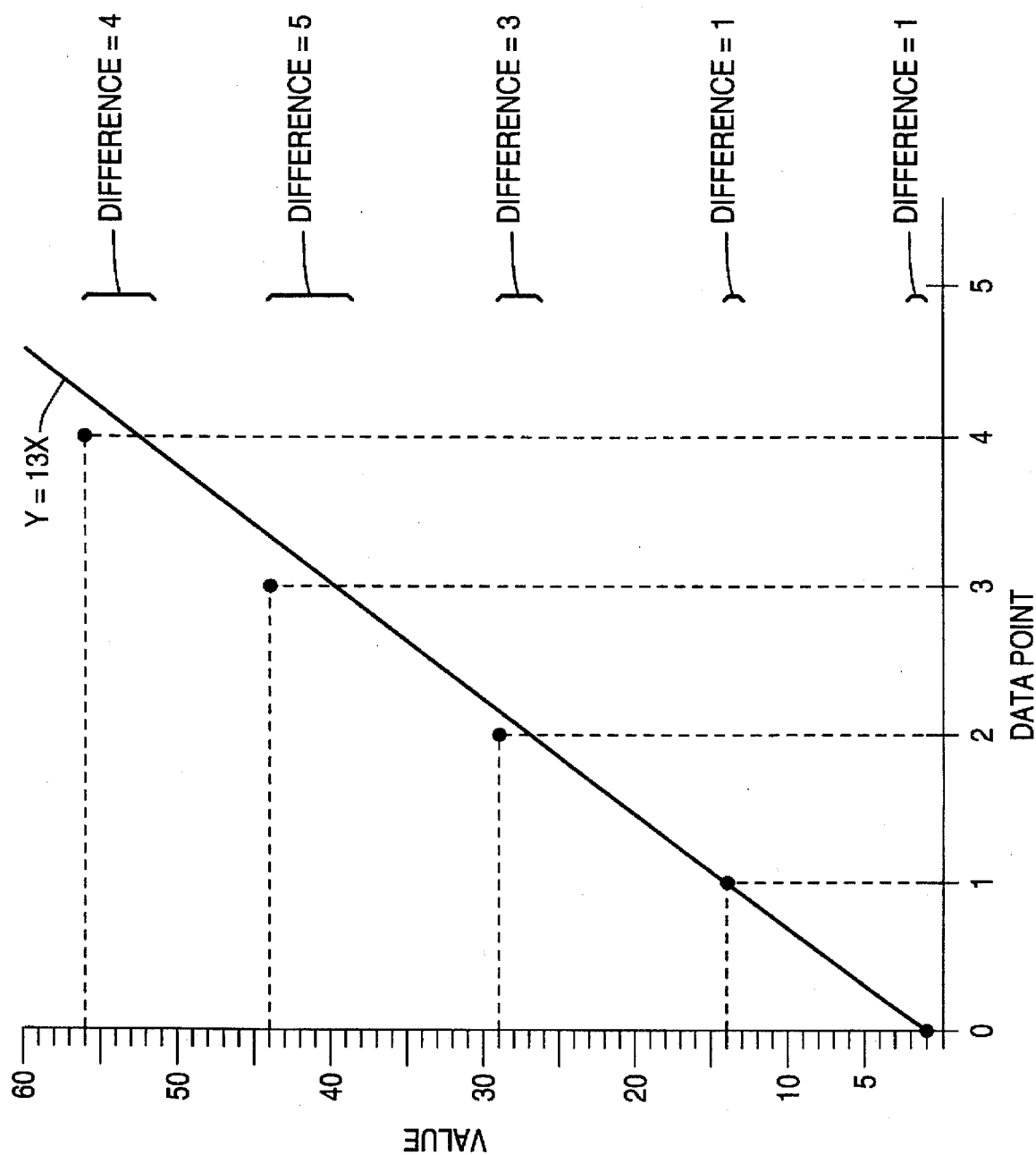
FIG. 16 illustrates, in two dimensions, how removal of a plane reduces the dynamic range of data.

FIG. 16 shows five data points, ranging from one to 56 in value, and listed in Table 15, below. The dynamic range is 56. For this dynamic range, a six-bit number is required to store each number (2 raised to the power of 6 equals 64).

However, if one generates a line having the equation $y=13x$ (which corresponds to the plane discussed above), as indicated in FIG. 16, one can subtract the line from the data points, as indicated by the DIFFERENCES in FIG. 16. Table 15 shows the data, before and after the subtraction. The value D is the data value before subtraction, while the DIFFERENCE is the value after subtraction.

Of course, the equation ($y=13x$) must also be stored, and this storage occupies memory space. However, the amount of memory needed to store this type of equation may be less than the extra memory required to store 6-bit words, as compared with 3-bit words.

TABLE 15

| Data Point (x) | Data Value (D) | 13x | D − 13x (DIFFERENCE) |
|---|---|---|---|
| 0 | 1 | 0 | 1 |
| 1 | 14 | 13 | 1 |
| 2 | 29 | 26 | 3 |
| 3 | 44 | 39 | 5 |
| 4 | 56 | 52 | 4 |

A similar procedure can be undertaken on the data of FIG. 11, which is represented as planes in FIG. 13. A plane is used for the subtraction, instead of the line shown in FIG. 16.

Therefore, in one alternate embodiment, the correction tables are pre-compressed by plane removal, prior to compression by the RICE procedure. The same plane can be removed from both tables, or different planes can be used for the tables. An example will illustrate one saving in data storage which the Inventors have encountered.

Example of Amount of Data Saved by Plane Subtraction

Applicants' investigations have shown that, for a tablet having a usable size of approximately 6×8 inches, and having two 26×26 correction matrices, each having 12-bit entries, the total memory space required is 2028 bytes. (The 26×26 correction matrices correspond to a 26×26 grid. A smaller grid, 5×5, is shown in FIG. 11.)

If the DIFFERENCEs (analogous to those shown in FIG. 16) are each represented by 9 bits, then the amount of data contained in the correction table is 2×26×26×9=12,168 bits, which corresponds to 1521 bytes. For a single plane, 6 overhead bytes are needed, giving a total of 1526 bytes.

Therefore, the data representing the table has been reduced from 2038 bytes to 1521 bytes. Six bytes of overhead are required for storage of the plane data. These 1521 bytes can then be compressed, using the Rice algorithm.

It is not necessary that the data be subtracted from (or, more generally, referenced to) a flat geometric plane. Other functions can be used. For example, if the computed (x,y) values are found to follow some type of sinusoidal form, then subtraction from a type of sinusoid would be indicated.

2. Rotation of Scan Direction

As stated above, the Inventors have found that the actual (x,y) positions, when plotted against computed (x,y) positions, tend to fall upon geometric planes. FIG. 13A provides examples. (It should be emphasized that FIG. 13A is a simplification. The data does not fall exactly on the planes. In fact, if it did, compression would not be needed at all: the equations of the planes would completely describe the computed x,y data.)

Planes are Orthogonal

Figure 17B:
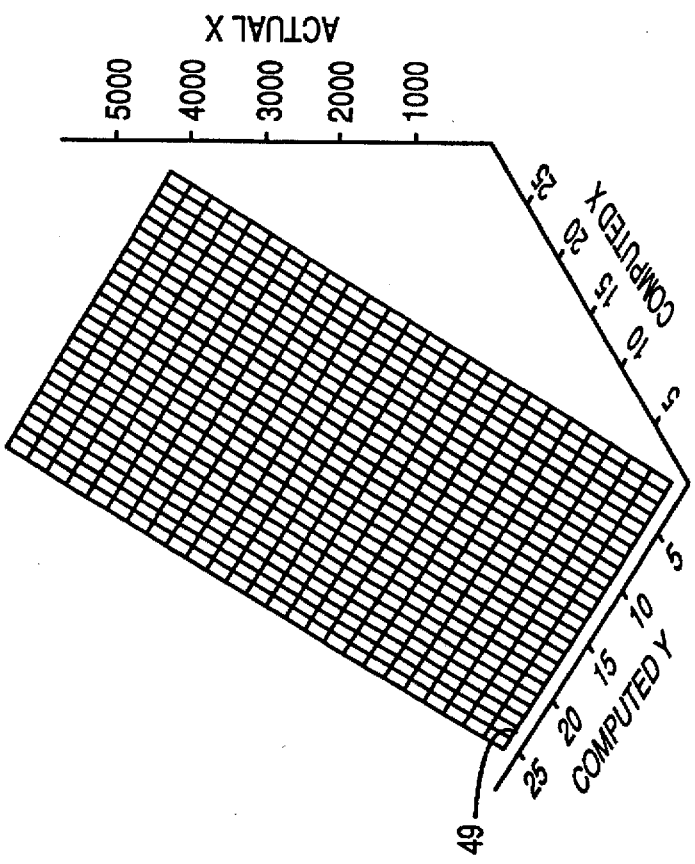
FIGS. 17A and 17B illustrates how the correction data approximate geometric planes.
Figure 17A:
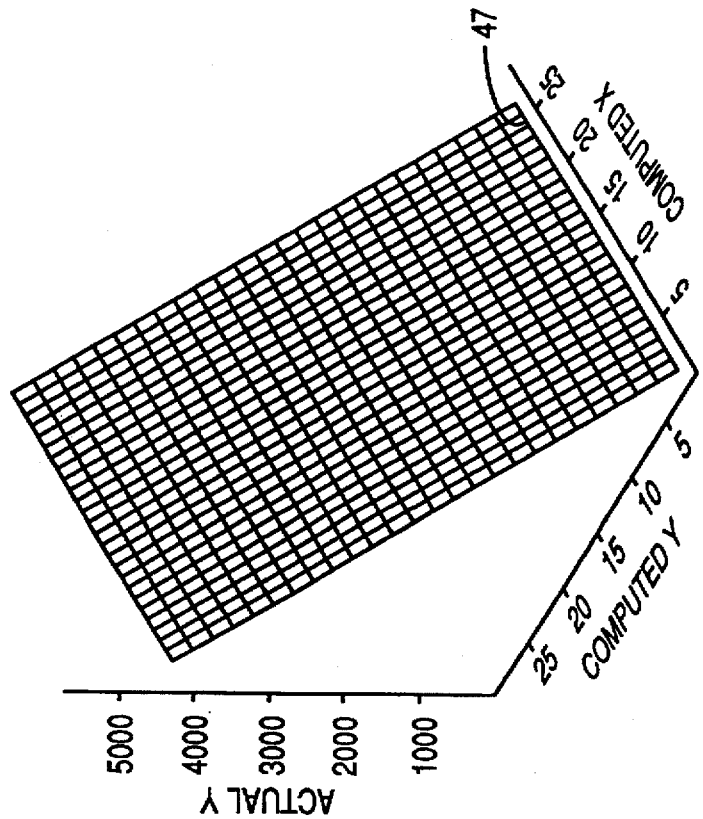

The Inventors have further found that the two planes of plots 33 and 36 are approximately orthogonal. FIGS. 17A and 17B illustrates orthogonality, based on a 26×26 grid. Line 47 is approximately parallel to the COMPUTED X axis. Line 49 is approximately parallel to the COMPUTED Y axis. Thus, line 47 is approximately orthogonal to line 49, because both are approximately parallel to lines which are orthogonal (the axes).

The Inventors have found that this orthogonality allows a particular type of compression approach to be used. This approach is perhaps easiest to explain by contrast to a different, simpler approach, which offers less optimal compression.

Simpler Example

Assume that the 25 (x,y) data pairs of FIG. 11 are to be compressed. (In actuality, the invention compresses a much larger array of data, namely a 26×26 array, or a 33×33 array, or larger, depending on the size of the tablet.) The points of FIG. 11 are also shown in FIG. 13A.

In the simpler approach, one scans across a row, as from point D to point H in dashed box 50 in FIG. 13A. The x-coordinates to be compressed are labeled D, E, F, G, and H in plot 36. The y-coordinates to be compressed are labeled D, E, F, G, and H in plot 33.

The dynamic range of the x-coordinates (running from 1.0 to 4.0) is much larger than that of the y-coordinates (they hover around 1.0). This larger dynamic range can cause the x-compression to be less optimal than the y-compression.

To avoid this problem, the invention scans in a different way. To compress the x-data, the invention scans from point D to J in grid 9, which correspond to the points between D an J in plot 36. These points have a small dynamic range (which hovers around 1.0), and compress well.

To compress the y-data, the invention scans from point D to H in grid 9, as in the simpler example, and plots the data as points D, E, F, G, and H in plot 33. These points also have a small dynamic range, and compress well.

Stated in other words, the invention scans grid 9 row-after-row during compression of the y-data, and column-after-column during compression of x-data.

Alternate View

Figure 24:
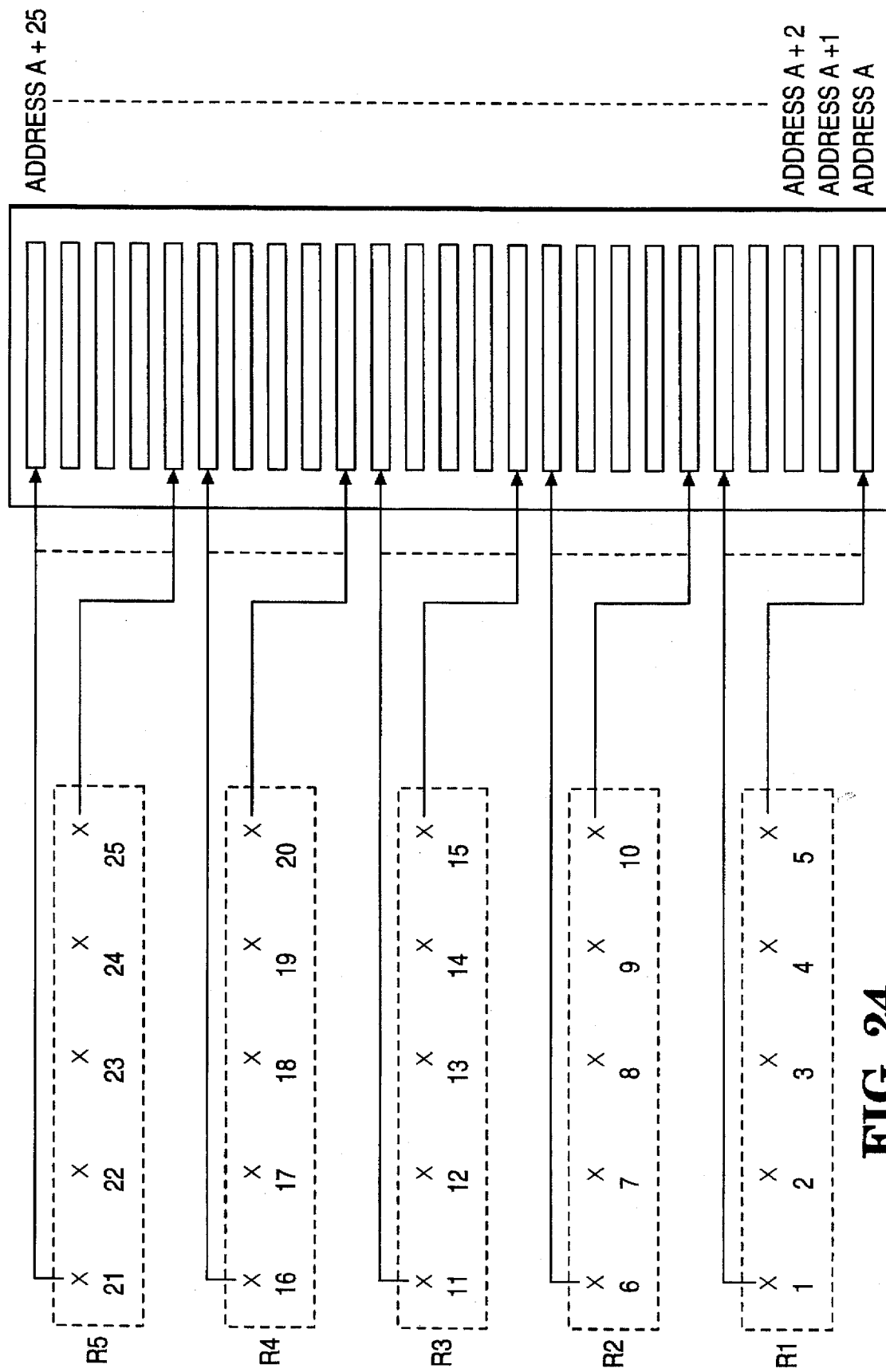
FIG. 24 illustrates storage of adjacent data in rows into adjacent memory locations.
Figure 25A:
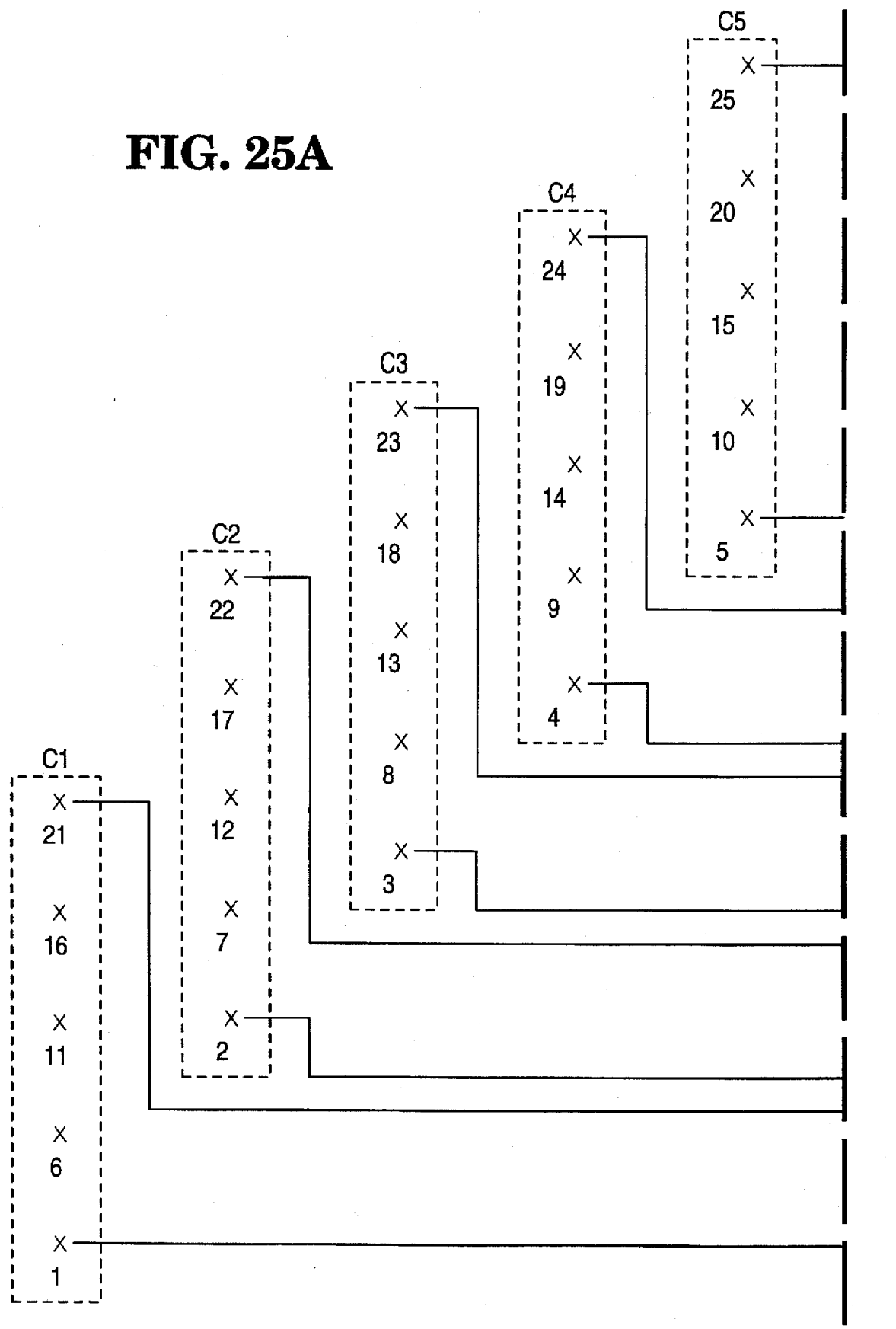
FIG. 25A–B illustrates storage of adjacent data in columns into adjacent memory locations.
Figure 25B:

FIGS. 24 and 25A–B illustrate one conception of this compression. In FIG. 24, adjacent data in each row is stored at adjacent memory locations. For example, the actual data for row R1 are stored at addresses A through A+4, in sequence, as indicated.

Adjacent rows themselves are also stored in adjacent memory locations. For example, row R1 is stored in A through A+4, as indicated. R2 is stored in A+5 through A+9, which are next to R1, and so on.

In FIG. 25A–B, adjacent data in each column is stored at adjacent memory locations. For example, the actual data for column C1 are stored at addresses B through B+4, in sequence, as indicated.

Adjacent columns themselves are also stored in adjacent memory locations. For example, column C1 is stored in B through B+4, as indicated. C2 is stored in B+5 through B+9, and so on.

It should be noted that FIGS. 24 and 25A–B are approximate. Different rows will compress differently. Thus, the five elements of one row will not necessarily fit into the same number of memory locations as the five elements of another row. Nevertheless, the concept of storing these compressed elements at adjacent locations still applies.

Second Alternate View

One basic concept behind the rotation of scan direction is to group the x-correction table (illustrated by plot 36 in FIG. 13C) into segments having reduced dynamic range, and compress each segment, according to the Rice procedure. The term "reduced" acquires meaning by reference to a grouping which has "larger" dynamic range.

For example, in FIG. 13C, the row, or group, running from point D to point J has a reduced dynamic range, compared with the row running from point D to point H. Preferably, the groupings are not only "reduced" in dynamic range, but also have minimal possible dynamic range.

The points of plot 33 in FIG. 13B are grouped similarly.

3. Data Padding of Segments

The preceding discussion has presumed that an entire row of x's in FIG. 11 (each row represented by a ROW in FIG. 18) or an entire column (each column represented by a COL in FIG. 19) have been grouped together and processed according to the Rice procedure. However, this is not strictly necessary.

For example, if the data within a row spans a large dynamic range, such as from 2 to 24 in the top row of FIG. 20, then it may be desirable to break a row (termed a "segment") into smaller sub-segments. That is, better compression can be obtained by processing the 2, 4, and 8 in the top row in one Rice procedure, and processing the 12 and 24 in a separate Rice procedure.

However, this approach requires sub-segments containing different numbers of samples (2, 4, 8 in one segment, and 12, 24 in the other), which imposes undesired complexity.

An alternate would be to place identical numbers of samples into each sub-segment, as shown in FIG. 21. The sub-segments are labeled S1, S2, S3, and S4. However, a problem with this approach is that some sub-segments, such as S2, contain both a first-column value and a last-column value. The data generally ascends in value from the first column to the last column, as indicated in FIG. 20. The first elements tend to be low, while the last elements tend to be high in value.

Including a low value with a high value, in the same subsegment, causes the dynamic range of the sub-segment to increase, thereby worsening compression behavior. (The original purpose of using sub-segments was to prevent this very situation.)

Figures 22, 23:
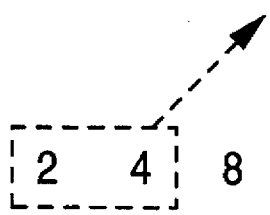
FIG. 22 illustrates how data padding allows rows of a correction table to be divided into equal segments.
FIG. 23 illustrates derivation of a PREDICTOR from two elements of a segment.

One embodiment of the invention eliminates this problem by padding each row (or column) with fictitious data, as shown in FIG. 22. The X's indicate the fictitious data. The X's allow each row, initially containing five data elements each, to now be divided into two sub-segments of three data elements each.

The particular data (i.e., the X's) are preferably chosen such that the DELTAS in the Rice computation become zero. With zero-valued DELTAS, the final compressed data, representing the X's, will be minimal, and will occupy little memory space. (The actual amount stored depends on the ID, and will not be reduced to zero. If comma codes are used, the amount stored will be one bit; otherwise, the amount stored will be as wide as the data.)

For example, if the PREDICTOR is 6, then the x's in FIG. 22 will also be 6.

4. Higher Order Predictor

The prior-art Rice procedure normally uses a variable PREDICTOR, which is initially based on the first element of data, such as the "2" in the upper left corner of FIG. 22. This is termed a "zeroth order PREDICTOR." The PREDICTOR is then replaced by a new value based on the most recently processed element in the current row or column.

One form of the invention uses higher-order PREDICTORS. For example, the first two data elements, such as the "2" and the "4" in FIG. 23, can be used. The PREDICTOR can be a linear extrapolation, based on these two numbers, which would be "6". Alternately, the PREDICTOR may be a type of mean of the two values, such as the numerical mean, which would be 3.

Such a PREDICTOR, which is based on two sample values, would be termed a "first-order PREDICTOR."

Other methods of deriving PREDICTORS, beside linear methods, can be used. Also, higher-order PREDICTORS can be used, based on a larger number of samples, and based on functions other than linear extrapolation.

Although many variations on the predictor are possible, the output of the predictor must be a deterministic function of at least its input and internal memory (called state in the art). This is important because the predictor values need to be available for decompression and having to store the output of the predictor along with the data would be impractical.

In order to reproduce the predicted values during decompression, the predictors used during compression and decompression must be identical. Being identical entails several key points. First, the deterministic function used to compute the output must be the same. If one predictor is doing linear extrapolation and the other is doing arithmetic averages, the predictor outputs will not match. However, satisfying this first point is very simple. Second, the inputs fed to the predictors must be equal. Unless one is dealing with the case where the output of the predictor is independent of the input, it should be clear that matching the predictor outputs requires a match on the inputs. However, since the input to the compression predictor is the original data, matching the inputs to the predictors just requires successful decompression of this data. Third, the initial state of the predictor must also be the same.

This third point will be illustrated by means of an example. Consider a variable zeroth order predictor as used in the prior-art Rice compressor. This predictor has a single state which holds the previous input to the predictor. The output is equal to the value stored in this state. After being used, the state is updated with the input value. When predicting the first value, the value stored in the state is used. However, since there has not been an input value yet, the value of the state has not been defined. If the initial state were zero, and the input data the first row of FIG. 23, the predictor's output would be: 0, 2, 4, 8, 12, 24. On the other hand, if the initial state of the predictor was 5, the predictor's output would be: 5, 2, 4, 8, 12, 24. The problem of a mismatched initial state is compounded by the fact that if the initial state is mismatched, the data can not be decompressed properly which leads to a mismatch at the input of the predictor also.

There are at least two ways to deal with assuring that the initial state of both predictors match. One simple approach is to specify a known state, like zero, every time an initial state is needed. Another approach is to initialize the state only once per table instead of once per segment and carryover the final state of a segment as the initial state of the next segment. However, neither approach is very efficient or practical for our application. Yet another approach is to store the initial state along with the compressed data so that it is available for use in the decompressor's predictor.

The inventors have found that best results are obtained when the predictor's initial state is set for each individual segment using data from the beginning of the segment. Since the initial state is variable, it needs to be stored along with the compressed data. However, since the initial state is equal to the data at the beginning of the segment, the compressed data corresponding to these values need not be stored.

Significant Points

1. Each digitizing tablet in a batch produced by a manufacturer will, in general, be different, because the manufacturing irregularities in each tablet will be different. Thus, each tablet will require a different pair of correction tables, graphically represented by the plots 33 and 36 in FIG. 12. Consequently, each tablet will require a different pair of compressed tables.

One implication is that the memory chips containing the tables are not interchangeable from tablet-to-tablet. Thus, if the manufacturer is to maintain a supply of replacement parts for the tablets, the manufacturer must maintain data for each tablet, from which replacement correction tables can be generated.

2. The use of the correction table is particularly important in the case of pen-based computers, wherein the computer draws a line beneath the stylus as the user moves the stylus along the display of the computer. Such a computer mimics the action of pen-on-paper, yet no actual ink-bearing pen is used. This simulation of pen-on-paper drawing is termed "inking" in the art.

If the computed stylus position deviated from the actual stylus position, then the inked line drawn by the computer would not lie beneath the point of the stylus, and would be quite confusing.

3. The correction tables represented by the plots 33 and 36 in FIG. 12 can be viewed as two sub-tables of a single correction table.

Numerous substitutions and modifications can be undertaken without departing from the true spirit and scope of the invention. What is desired to be secured by Letters Patent is the invention as defined in the following claims.

We claim:

1. A method of operating a computer having a display, comprising the following steps:

deriving computed stylus positions from signals received from a stylus moving through different actual positions on the display;

deriving signals representing actual stylus positions from the computed positions, using one or more correction tables, stored in compressed form; and generating marks at the actual positions, based on the derived signals.

2. In the process of generation of a correction table for a digitizing tablet, the improvement comprising:

a) compressing the table, according to a first procedure; and then b) further compressing compressed data in the table, according to a second procedure.

3. In the process of generation of a correction table for a digitizing tablet, the improvement comprising:

a) compressing the table, according to a first procedure; and then b) further compressing the table, according to a second procedure, wherein the first procedure comprises the step of finding differences between table values and a function.

4. The process according to claim 3 in which the function represents a geometric surface.

5. The process according to claim 2 in which the second procedure comprises Rice-type compression.

6. In the process of manufacture of a digitizing tablet, which uses a correction table for deriving actual stylus positions from computed stylus position, the improvement comprising:

a) compressing the correction table, using a procedure which comprises one or more of the following steps:

i) dividing the table into segments of containing equal numbers of elements, and compressing each segment;

ii) using a compression technique in which a difference between a PREDICTOR and each data element is found;

iii) subtracting a function from all data elements; and iv) testing different groupings of the elements into segments, and choosing the groupings which provide superior compression.

7. A procedure for manufacturing a correction table which is stored in memory in a digitizing tablet, comprising the following steps:

a) computing position signals for each of several actual stylus positions upon the tablet;

b) generating a correction table from which actual position can be inferred from computed position signals; and c) compressing the correction table, and storing the compressed correction in memory in the tablet.

8. A procedure for manufacturing a correction table which is stored in memory in a digitizing tablet, comprising the following steps:

a) computing position signals for each of several actual stylus positions upon the tablet;

b) generating a correction table from which actual position can be inferred from computed position signals; and c) compressing the correction table, and storing the compressed correction in memory in the tablet, whereby the correction table is divided into segments, and each segment is compressed differently.

9. A procedure for manufacturing a correction table which is stored in memory in a digitizing tablet, comprising the following steps:

a) computing position signals for each of several actual stylus positions upon the tablet;

b) generating a correction table from which actual position can be inferred from computed position signals; and c) compressing the correction table, and storing the compressed correction in memory in the tablet, whereby the correction table contains a sub-table of x-correction data, and a sub-table of y-correction data, and further comprising the step of compressing the x-correction sub-table row-by-row, and the y-correction sub-table column-by-column.

10. The procedure according to claim 8, in which some of the segments contain fictitious padding data.

11. The procedure according to claim 8, in which data in each segment is compared to a PREDICTOR.

12. The procedure according to claim 11 in which the PREDICTOR is re-initialized for each segment to a known state.

13. The procedure according to claim 11 in which the PREDICTOR is re-initialized for each segment to a state that varies with segment.

14. The procedure according to claim 13 in which the state of the PREDICTOR is stored as part of the compressed data.

15. The procedure according to claim 13 in which the data used to initialize the state of the PREDICTOR is not stored as part of the compressed data.

16. In the process of generation of a correction table for a digitizing tablet, from which actual stylus position can be derived from computed x and y values of stylus position, the improvement comprising:

a) grouping computed values into an x-array and a y-array;

b) deriving a mathematical function which approximates each array;

c) for each value in each array, finding a difference between the value and the respective function;

d) compressing the differences; and e) storing the compressed differences in the tablet.

17. In the process of generation of a correction table for a digitizing tablet, from which actual stylus position can be derived from computed x and y values of stylus position, the improvement comprising:

a) grouping computed values into an x-array and a y-array; and b) padding the array with fictitious data, to allow division of rows into whole numbers of segments.

* * * * *